US012620250B2

(12) United States Patent
Koch et al.

(10) Patent No.: US 12,620,250 B2
(45) Date of Patent: May 5, 2026

(54) GENERALIZED ANOMALY DETECTION

(71) Applicant: Onfido Ltd., London (GB)

(72) Inventors: Olivier Koch, London (GB); Philip Botros, London (GB); Christos Sagonas, London (GB); Francesco Picciotti, London (GB)

(73) Assignee: Onfido Ltd., London (GB)

(*) Notice: Subject to any disclaimer, the term of this patent is extended or adjusted under 35 U.S.C. 154(b) by 444 days.

(21) Appl. No.: 18/084,915

(22) Filed: Dec. 20, 2022

(65) Prior Publication Data

US 2023/0147685 A1 May 11, 2023

Related U.S. Application Data

(63) Continuation-in-part of application No. 17/830,208, filed on Jun. 1, 2022, now Pat. No. 12,423,788.

(30) Foreign Application Priority Data

Jun. 14, 2021 (EP) ..................................... 21179304
Oct. 28, 2022 (EP) ..................................... 22204513

(51) Int. Cl.
G06V 30/413 (2022.01)
G06V 10/25 (2022.01)
G06V 10/26 (2022.01)

(52) U.S. Cl.
CPC ............ G06V 30/413 (2022.01); G06V 10/25 (2022.01); G06V 10/26 (2022.01)

(58) Field of Classification Search
CPC ...... G06V 30/413; G06V 10/25; G06V 10/26; G06V 30/147; G06V 30/19147; G06V 30/133
See application file for complete search history.

(56) References Cited

U.S. PATENT DOCUMENTS

| | | | |
|---|---|---|---|
| 7,590,344 B2 | 9/2009 | Petschnigg | |
| 7,672,475 B2 | 3/2010 | O'Doherty et al. | |

(Continued)

FOREIGN PATENT DOCUMENTS

| | | | |
|---|---|---|---|
| DE | 102018102015 A1 | 8/2019 | |
| EP | 4105825 A1 | 12/2022 | |

(Continued)

OTHER PUBLICATIONS

Hudson et al "Generative Adversarial Transformers" Cornell University Library, Mar. 2, 2021.

(Continued)

*Primary Examiner* — Phuoc Tran
(74) *Attorney, Agent, or Firm* — Merchant & Gould P.C

(57) ABSTRACT

Described are methods and systems for training a system for detecting anomalies in images of documents in a class of documents. A plurality of training document images of training documents in a class of documents are obtained. For each training document image, the training document image is segmented into a plurality of region of interest (ROI) images, each ROI image corresponding to a respective ROI of the training document. For each ROI image, a plurality of transformations are applied to the ROI image to generate respective transform-specific features for the ROI image and respective transform-specific anomaly scores from the transform-specific features. Based on the respective anomaly scores of the plurality of training document images, a transform-specific threshold is computed for each transformation to separate document images containing an anomaly from document images not containing an anomaly.

16 Claims, 14 Drawing Sheets

(56) References Cited

U.S. PATENT DOCUMENTS

| | | | |
|---|---|---|---|
| 8,025,239 | B2 | 9/2011 | Labrec et al. |
| 8,786,767 | B2 | 7/2014 | Rihn et al. |
| 9,058,535 | B2 | 6/2015 | Guigan |
| 9,081,988 | B2 | 7/2015 | Dolev |
| 9,153,005 | B2 | 10/2015 | Tremolada et al. |
| 9,418,282 | B2 | 8/2016 | Rutz et al. |
| 10,019,626 | B2 | 7/2018 | Schilling et al. |
| 10,019,627 | B2 | 7/2018 | Kutter et al. |
| 10,043,071 | B1 | 8/2018 | Wu |
| 10,127,454 | B2 | 11/2018 | Pau et al. |
| 10,354,142 | B2 | 7/2019 | Arlazarov et al. |
| 10,402,448 | B2 | 9/2019 | Filgueiras De Araujo et al. |
| 10,477,087 | B2 | 11/2019 | Rivard et al. |
| 10,621,426 | B2 | 4/2020 | Gaubatz et al. |
| 10,789,463 | B2 | 9/2020 | Kutter et al. |
| 10,872,488 | B2 | 12/2020 | Azanza Ladrn et al. |
| 11,354,917 | B2 | 6/2022 | Martin |
| 11,450,152 | B2 | 9/2022 | Ramachandra |
| 2006/0281435 | A1 | 12/2006 | Shearer |
| 2007/0041628 | A1 | 2/2007 | Fan |
| 2008/0158258 | A1 | 7/2008 | Lazarus et al. |
| 2014/0037196 | A1 | 2/2014 | Blair |
| 2014/0055824 | A1 | 2/2014 | Tremolada et al. |
| 2017/0132465 | A1 | 5/2017 | Kutter et al. |
| 2019/0220660 | A1 | 7/2019 | Cali et al. |
| 2019/0392196 | A1 | 12/2019 | Sagonas et al. |
| 2020/0184212 | A1* | 6/2020 | Anthony Samy ...... G06N 20/20 |
| 2020/0311409 | A1 | 10/2020 | Luo et al. |
| 2020/0379868 | A1 | 12/2020 | Dherange |
| 2021/0004949 | A1 | 1/2021 | Broyda |
| 2021/0019519 | A1 | 1/2021 | Martin et al. |
| 2021/0124919 | A1 | 4/2021 | Balakrishnan et al. |
| 2021/0160687 | A1 | 5/2021 | Ross et al. |
| 2021/0200855 | A1 | 7/2021 | Guigan |
| 2022/0284301 | A1 | 9/2022 | Qiu et al. |
| 2022/0351532 | A1 | 11/2022 | Gietema |
| 2023/0069960 | A1 | 3/2023 | Mahadevan et al. |
| 2023/0281959 | A1* | 9/2023 | Hoshen .................. G06N 3/045 382/225 |
| 2024/0242487 | A1* | 7/2024 | Conde .................. G06V 10/764 |

FOREIGN PATENT DOCUMENTS

| | | | |
|---|---|---|---|
| EP | 4361971 | A1 | 5/2024 |
| FR | 2977349 | A3 | 1/2013 |
| WO | 2020255137 | A1 | 12/2020 |
| WO | 2021044082 | A1 | 3/2021 |

OTHER PUBLICATIONS

"CARS 2020—Computer Assisted Radiology and Surgery Proceedings of the 34th International Congress and Exhibition, Munich, Germany, Jun. 23-27, 2020 ED—Barratt D; Jannin P; Fitchinger G; Cotin S," International Journal of Computer Assisted Radiology and Surgery, Springer, DE, vol. 15, No. 1, Suppl 1, Jun. 1, 2020, pp. 1-214.

Dosovitskiy, Alexey et al., "An image is worth 16×16 words: Transformers for image recognition at scale," Jun. 3, 2021, pp. 1-22.

G. Evangelidis and E. Psarakis, "Parametric Image Alignment Using Enhanced Correlation Coefficient Maximization," IEEE Transactions on Pattern Analysis and Machine Intelligence 30(10), Oct. 2008, 1858-1865.

N. Ahmed, T. Natarajan, and K.R. Rao, "Discrete Cosine Transform," IEEE Transactions on Computers, vol. C-23, Issue 1, Jan. 1974, pp. 90-93.

H. Abdi and L.J. Williams, "Principal Component Analysis," Wiley Interdisciplinary Reviews: Computational Statistics, vol. 2, Issue 4, Jul. 15, 2010, pp. 433-459.

R. Haralick, K. Shanmugam, and I.H. Dinstein, "Textural Features for Image Classification," IEEE Transactions on Systems, Man, and Cybernetics, vol. SMC-3, Issue 6, Nov. 1973, pp. 610-621.

T. Ojala, M. Pietikainen, and T. Maenpaa, "Multiresolution Grayscale and Rotation Invariant Texture Classification with Local Binary Patterns," IEEE Transactions on Pattern Analysis and Machine Intelligence, vol. 24, Issue 7, Jul. 2002, pp. 971-987.

D. Lowe, "Distinctive Image Features from Scale-Invariant Keypoints," International Journal of Computer Vision, 60(2), Nov. 2004, pp. 91-110.

K. Simonyan and A. Zisserman, "Very Deep Convolutional Networks for Large-Scale Image Recognition," arXiv:1409.1556 [cs. CV], Apr. 10, 2015.

Search Report issued in EP4105825, completed Nov. 15, 2021.

Search Report issued in EP4361971, completed Mar. 17, 2023.

* cited by examiner

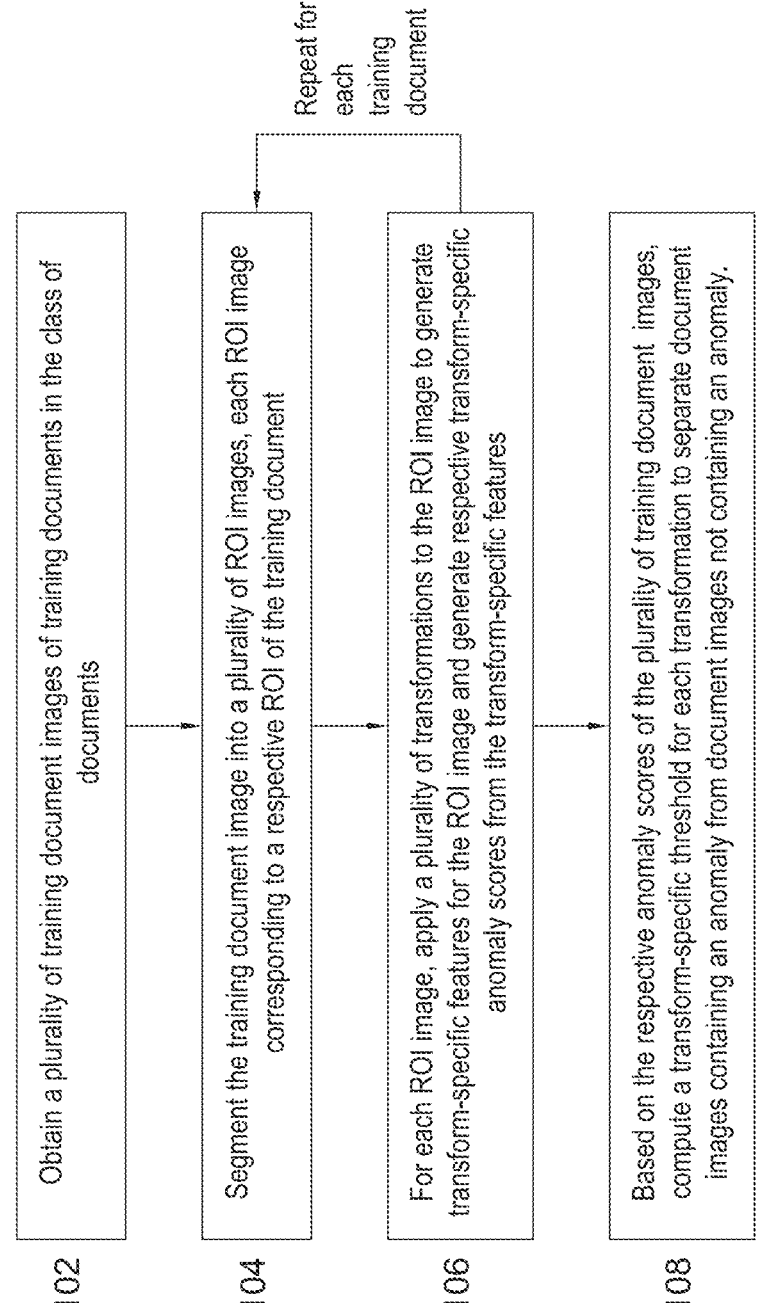

100

102   Obtain a plurality of training document images of training documents in the class of documents 104   Segment the training document image into a plurality of ROI images, each ROI image corresponding to a respective ROI of the training document 106   For each ROI image, apply a plurality of transformations to the ROI image to generate respective transform-specific features for the ROI image and generate respective transform-specific anomaly scores from the transform-specific features 108   Based on the respective anomaly scores of the plurality of training document images, compute a transform-specific threshold for each transformation to separate document images containing an anomaly from document images not containing an anomaly.

Repeat for each training document

FIG. 1

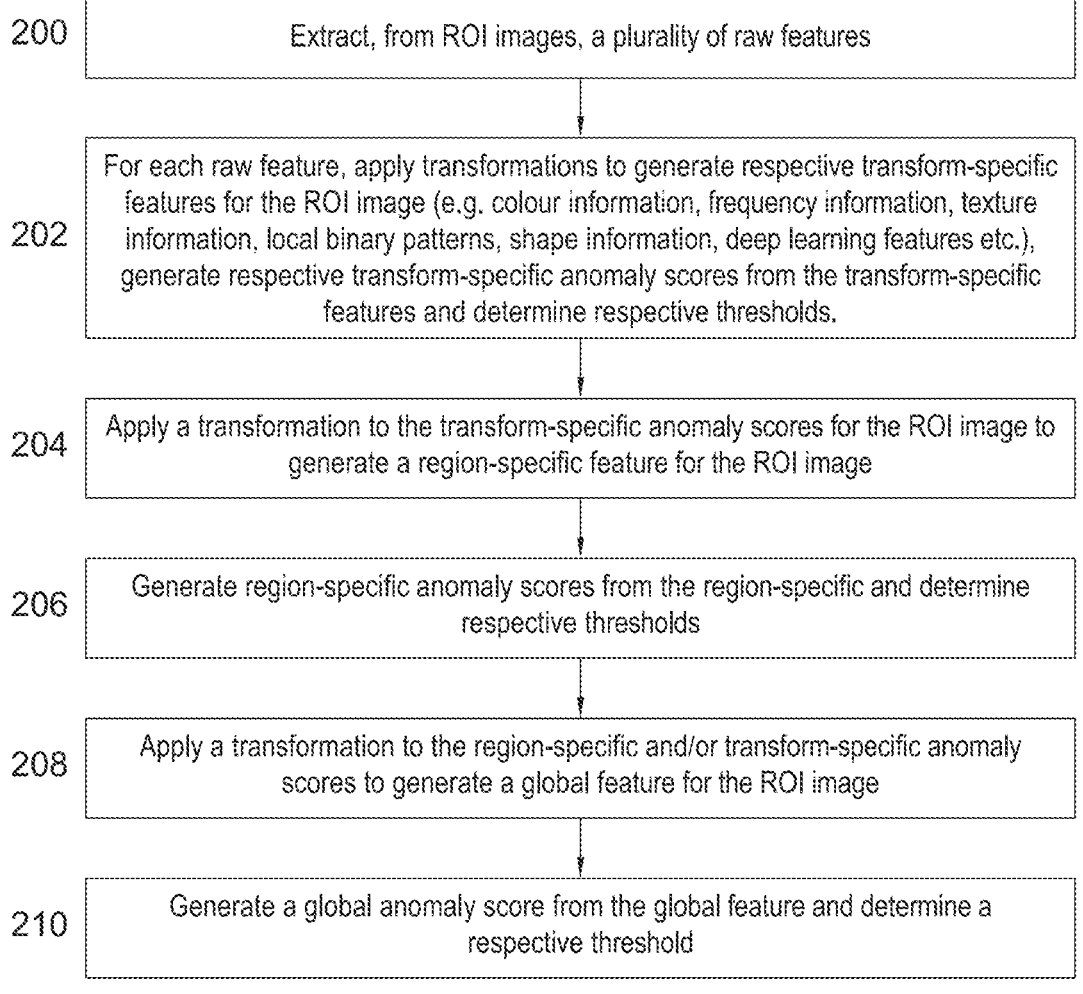

200 | Extract, from ROI images, a plurality of raw features

202 | For each raw feature, apply transformations to generate respective transform-specific features for the ROI image (e.g. colour information, frequency information, texture information, local binary patterns, shape information, deep learning features etc.), generate respective transform-specific anomaly scores from the transform-specific features and determine respective thresholds.

204 | Apply a transformation to the transform-specific anomaly scores for the ROI image to generate a region-specific feature for the ROI image 206 | Generate region-specific anomaly scores from the region-specific and determine respective thresholds 208 | Apply a transformation to the region-specific and/or transform-specific anomaly scores to generate a global feature for the ROI image 210 | Generate a global anomaly score from the global feature and determine a respective threshold

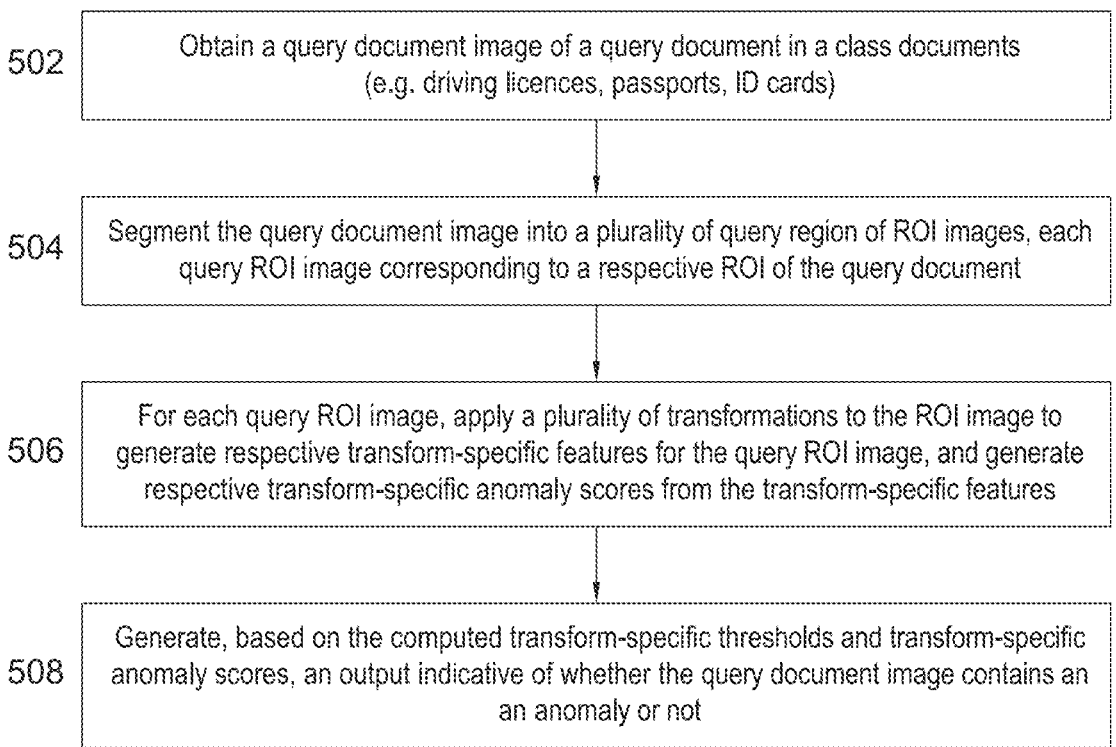

| 502 | Obtain a query document image of a query document in a class documents (e.g. driving licences, passports, ID cards) |
| 504 | Segment the query document image into a plurality of query region of ROI images, each query ROI image corresponding to a respective ROI of the query document |
| 506 | For each query ROI image, apply a plurality of transformations to the ROI image to generate respective transform-specific features for the query ROI image, and generate respective transform-specific anomaly scores from the transform-specific features |
| 508 | Generate, based on the computed transform-specific thresholds and transform-specific anomaly scores, an output indicative of whether the query document image contains an an anomaly or not |

FIG. 5

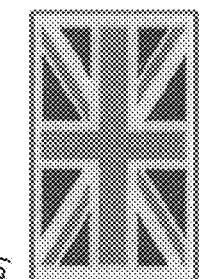
b) 704
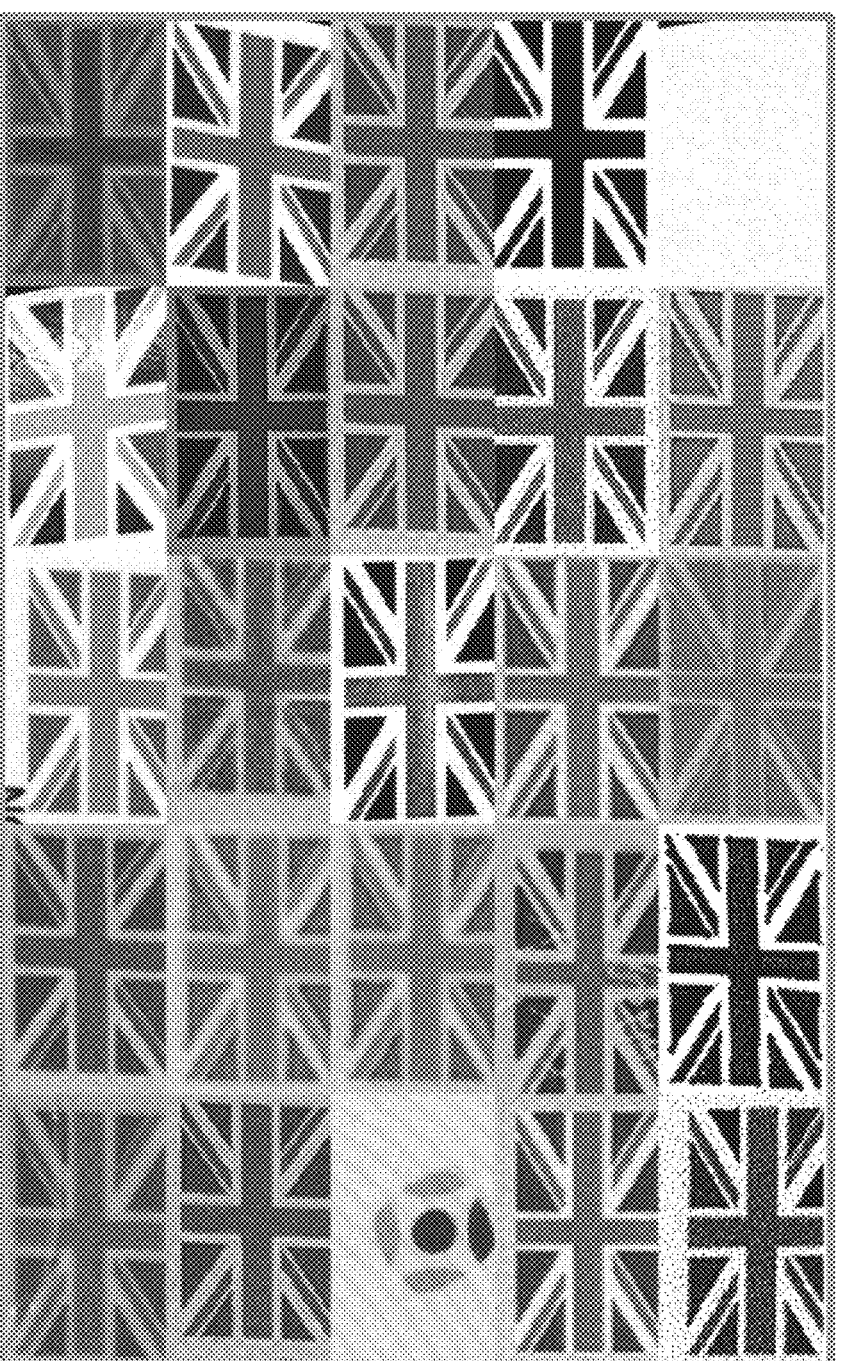
a) 702
FIG. 7

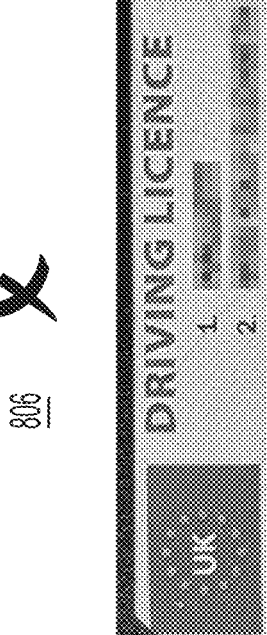
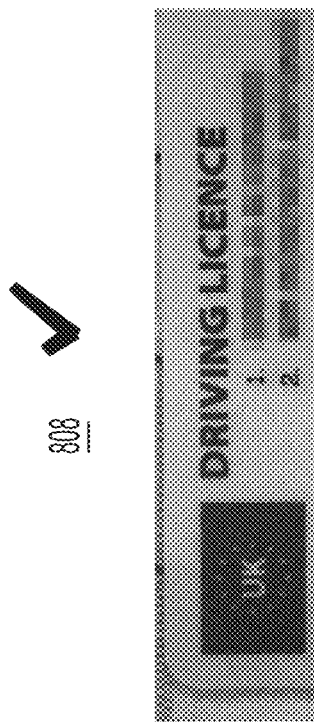
FIG. 8C

GENERALIZED ANOMALY DETECTION

RELATED APPLICATIONS

This application claims priority to European Patent Application No. EP22204513.0, filed on Oct. 28, 2022. This application is also a continuation-in-part of U.S. patent application Ser. No. 17/830,208, filed on Jun. 1, 2022, now U.S. Pat. No. 12,423,788; which claims priority to European Patent Application No. EP21179304.7, filed on Jun. 14, 2021. Each of these applications is incorporated herein by reference in its entirety.

TECHNICAL FIELD

The subject matter of the application relates generally to a method for detecting anomalies in images of a document in a class of documents. In particular, the disclosure relates to applying a plurality of transformations to images of regions of interest in the document to detect anomalies in images of a document.

BACKGROUND

Digital identity verification systems require users to submit images of government issued documents remotely using mobile phones, computers or any other digital device. This information is then used to grant users access to services or products of different kinds such as online banking, brokering, conveyancing, property letting or car rentals. The remote nature of digital onboarding combined with the potential high value of these services leaves such verification systems open to fraudsters from around the world who may attempt to defraud the systems. For example, a fraudster may impersonate another person by tampering with identity documents, resulting in documents containing anomalies. There are, of course, other ways of digitally defrauding a system such as submitting false biometric data by impersonating someone else or intercepting results from a service provider to its clients and unauthorized tampering. However, the focus of the present application is on solving the problem of detecting anomalies in documents, wherein the anomalies may be indicative of fraudulent tampering with the documents.

There are several major challenges that arise when attempting to detect anomalies in documents. First, there is a high variability across different documents types and across different countries. Moreover, as technology evolves and new fraud attacks are revealed, additional security features or design changes are permanently added and new versions of certain document types are created as a result. Thus, a need for a modular anomaly detection model that can be changed on a continuous basis arises. Second, images of such documents contain high levels of intrinsic noise (e.g., certain security features such as holograms appear differently from one document to another) and extrinsic noise (e.g., sensor noise, differing light levels, blur etc.), as well as a convolution of both. Third, there is a lack of genuine reference documents for certain countries, which fraudsters might therefore target, creating a need for easily scalable approaches. Fourth, comprehensive fraudulent data are frequently lacking or extremely limited, especially as new, specific fraud types are continuously being developed, thus creating a need for an anomaly detection model that can be trained without necessarily using fraudulent data for training. Because models are trained across thousands of different document classes, when a new type of fraud is incorporated, there is a need for a global model update, which can alter performance and can delay a prompt response. Additionally, general fraud detection models do not provide explanations about the decision to mark documents as fraudulent or not, therefore making human-driven verification of the anomalies flagged by the system inefficient and ineffective. Finally, as fraudsters develop new fraud attacks, the performance of fraud-specific anomaly detection models (e.g. picture swap, font anomaly) is severely affected as any unknown type of fraud can easily pass undetected by the model.

There is therefore a need for a new automated approach that can rapidly deliver modular, adaptable, scalable, interpretable and customized solutions.

SUMMARY

The invention, in one aspect, features a computer implemented method of training a system for detecting anomalies in images of documents in a class of documents—for example, British passports, American driver's licenses, French identity cards, etc.—is disclosed. The first stage of the method involves obtaining plurality of training document images of a training documents in the class of documents (e.g., driver's licenses, passports, ID cards).

During the next stage of the method, each training document image is segmented into a plurality of region of interest (ROI) images, each ROI image corresponding to a respective ROI of the training document. A region of interest of an image represents a region deemed to be rich in information about the image and can be a portion of or the whole image. For example, an ROI of a document can be a portion of a document that is rich in information about the document, unique and hard to reproduce. In practice, ROI images of a document could comprise images of security features, face pictures, sophisticated background patterns, digital images of holograms, etc. The ROIs of a document may be defined manually or automatically and are specific to the class of document. That is, if the class of documents is UK driving licenses, the Union Jack and the 'Driving license' text at the top of the document may be two of the ROIs for this class of documents. At the end of this stage, a plurality of ROI images are obtained from each training document image. Since the level of noise of an ROI image is lower than that of all the ROI images pooled together, focusing on specific ROI images of a document in a specific class of documents advantageously enables significant performance gains to be obtained when predicting the presence or absence of anomalies in a document.

During the next stage, for each ROI image in the plurality of ROI images, a plurality of transformations is applied to the ROI image to generate respective transform-specific features for the ROI image, and, next, transform-specific anomaly scores are generated from the transform-specific features for the ROI image. The anomaly score represents a measure of how well a feature of the ROI image matches corresponding features in ROI images of training documents of the same class of documents other than the respective training document. The number and/or type of transformations that are applied may be the same or different for each ROI image and may be advantageously chosen so they are specifically suited to the ROI image. For example, in the case of the Union Jack ROI image on a UK driving license, the transformations applied may be chosen to capture the color features of the Union Jack symbol. In some embodiments, the same number and type of transformations may be applied to all or some of the ROI images, while in other embodiments, different numbers and types of transformations may be applied to each ROI image.

This way, the design of the method advantageously provides flexibility with regards to the number and type of transformations to apply to best capture the underlying patterns indicative of the presence or absence of anomalies in an image of a document. By disentangling the analysis across a plurality of transformations and across a plurality of ROI images in this way, the model performance is further improved. Additionally, these features result in a highly-modular approach, which enables the method to be easily and efficiently adapted locally to any specific type of document. The modularity of the method advantageously ensures a continuous performance improvement by enabling the addition/replacement/removal of transformations and the efficient propagation of these changes across multiple document classes and ROIs. For example, when new transformations that better capture the features of a specific ROI (e.g., holograms) of a document class are identified, these can be easily added to the plurality of transformations already applied to that particular ROI. Even further, if other ROIs or document classes contain a similar type of feature (e.g., passports and driving licenses that both contain ROIs), the new transformations can easily be incorporated into this stage for the specific ROI and document class due to the modularity and local adaptability of the method. By decomposing the document image into a set of ROIs and further decomposing each ROI image into a set of transform-specific and/or region-specific features, embodiments of which will be described in more detail below, the method allows the exact pinpointing of which specific ROI and which specific feature of the ROI is anomalous. This advantageously ensures a high level of interpretability which enables the provision of explanations behind the output and flagging of anomalous regions and features for further inspection.

During the final stage, based on the respective anomaly scores computed for the plurality of training document images, the method computes a transform-specific threshold for each transformation to separate document images containing an anomaly from document images not containing an anomaly. It can be seen that the described methods provide a modular approach that can be easily updated without sacrificing performance or causing delays and can provide transparency in that the decision to flag a document as an anomaly may be decomposed by ROI and/or transformation, in some embodiments.

Optionally, applying the plurality of transformations to generate a respective feature for the ROI image may comprise (i) extracting, from the ROI image, a plurality of raw features, and (ii) for each raw feature, applying a transformation to generate the respective transform-specific feature for the ROI image. Optionally, applying the plurality of transformations may comprise one or more of extracting color information, frequency information, texture information, shape information, location, or machine learned features. Extracting, from the ROI image, a plurality of raw features may comprise pre-processing such as contrast stretching, transformation of the ROI image to another color space (e.g., YcBcR color space, grayscale image, HSV), applying a pre-trained machine learning algorithm to the image (e.g., a pre-trained neural network).

Optionally, for each ROI image, a transformation may be applied to the transform-specific anomaly scores for the ROI image to generate a region-specific anomaly score for the ROI image. The role of applying the transformation is to summarize the transform-specific anomaly scores of the ROI image and transform them into a region-specific anomaly score using information captured from all the transform-specific features of the ROI image (e.g., color information, frequency information, pattern information, etc.). The region-specific anomaly score represents a measure of how well the ROI image matches corresponding ROI images of training documents of the same class of documents other than the respective training document. Next, based on the respective region-specific anomaly scores generated for the plurality of training document images, the method may compute a region-specific threshold for each ROI to separate document images containing an anomaly from document images not containing an anomaly. Optionally, for each training document image, the method may comprise generating a global anomaly score from the transform specific and/or, as applicable, region-specific anomaly scores. The method may then compute, based on the respective global anomaly scores for the training documents, a global threshold for the document class to separate document images containing an anomaly from document images not containing an anomaly.

Optionally, the thresholds are set to achieve a corresponding predetermined false rejection rate. That is, each transform-specific threshold, region-specific threshold and the global threshold are set to achieve a predetermined false rejection rate.

Optionally, the one or more of the anomaly scores may be computed based on a distance measure that is indicative of the distance between the transform-specific or, as applicable, region-specific features of the respective ROI image and a plurality of transform-specific or, as applicable, region-specific features of corresponding ROI images of training documents in the class of documents other than the respective training document. Optionally, the distance measure may be a Mahalanobis distance. The distance measure may be the class of distance measuring metrics, for example any one or more distance metrics alone or in combination.

Optionally, if the plurality of training document images contains training document images that contain and anomaly and training document images that do not contain an anomaly, a distance measure may be computed as the anomaly score as the distance between an ROI image and corresponding ROI images of training documents in the same class of documents other than the ROI image that do not contain an anomaly. Optionally, an additional distance measure may be computed as the distance between the ROI image and corresponding ROI images of training documents in the same class of documents other than the ROI image that contain an anomaly. The distance measures may then be combined to compute an anomaly score for the ROI image.

Optionally, the document image may be a frame of a video of the document. Optionally, the video of the document may comprise an ordered sequence of frames and each frame in the ordered sequence of frames may correspond to a document image and the plurality of transformations may be applied to the sequence of frames. Transformations may be applied to frames in sequence, to individual frames or any combination of frames.

Optionally, the one or more of the transformations comprise machine learning models and/or anomaly scores may be derived as an output of a machine learning model. For example, the machine learning models may comprise at least one supervised machine learning model and at least one unsupervised machine learning model. Likewise, the machine learning models may comprise anomaly detectors, such as isolation forests or a one-class classifier, for example a one-class support vector machine, that can be applied, for example, when only genuine documents are available. When fraudulent or anomalous documents are also available for training, supervised classifiers such as any two or more class classifier or unsupervised clustering algorithms may be applied. Through its local adaptability and high modularity, the method advantageously enables the automatic or manual selection of a supervised or unsupervised, or anomaly detection/one-class classifier or two or more class classifiers or clustering, machine learning model, depending on the amount of training data, in particular the amount of fraud or anomalous examples, available for a particular ROI and class of documents. When sufficient document images containing an anomaly are available for a particular ROI and class of documents, a supervised machine, or a two-class or clustering, learning model may be chosen and trained using the labelled document images containing an anomaly and the labelled document images not containing an anomaly.

The invention, in another aspect, features a system for sourcing training images for a system for detecting anomalies in images of documents in a class of documents, the system comprising a computing device having a memory for storing computer-executable instructions and a processor that executes the computer-executable instructions. The system obtains one or more document images of a fraudulent document. For each document image, the system segments the document image into one or more region of interest (ROI) images, each ROI image corresponding to a respective ROI of the fraudulent document. The system generates a vector representation of each ROI image in an embedding space, the embedding space comprising vector representations of one or more other ROI images from a plurality of sample document images. The system determines a similarity between each ROI image from the fraudulent document and one or more other ROI images from sample document images using the vector representations in the embedding space. The system selects a plurality of sample document images that have ROI images similar to the ROI images from the fraudulent document and generating a training data set using the selected sample document images. The system trains a supervised anomaly detection machine learning model using the training data set.

The invention, in another aspect, features a computerized method of sourcing training images for a system for detecting anomalies in images of documents in a class of documents. A system obtains one or more document images of a fraudulent document. For each document image, the system segments the document image into one or more region of interest (ROI) images, each ROI image corresponding to a respective ROI of the fraudulent document. The system generates a vector representation of each ROI image in an embedding space, the embedding space comprising vector representations of one or more other ROI images from a plurality of sample document images. The system determines a similarity between each ROI image from the fraudulent document and one or more other ROI images from sample document images using the vector representations in the embedding space. The system selects a plurality of sample document images that have ROI images similar to the ROI images from the fraudulent document and generating a training data set using the selected sample document images. The system trains a supervised anomaly detection machine learning model using the training data set.

Optionally, the vector representation of each ROI image is generated using a vision transformer (ViT) model. Optionally, the similarity is determined using a distance metric. Optionally, the one or more document images of the fraudulent document are obtained from an external application programming interface (API) or a user interface of a production anomaly detection system. Optionally, at least one of the one or more ROI images comprises an image of the entire fraudulent document.

Optionally, at least one of the one or more ROI images comprises an image of a portion of the fraudulent document. Optionally, generating a vector representation of each ROI image in an embedding space comprises projecting the vector representation into the embedding space. Optionally, training a supervised anomaly detection machine learning model using the training data set comprises training a plurality of supervised anomaly detection machine learning models using the training data set, each supervised anomaly detection machine learning model corresponding to a respective ROI of the fraudulent document.

Alternatively, if no document images containing an anomaly are available or only a very small number of such images is available, an unsupervised machine learning model, or an anomaly detection or one-class classifier model, may be chosen. Such a machine learning model may be trained using document images not containing anomalies. This is an advantageous feature of the present disclosure, enabled by the pooling together of the many different region-specific and/or transformation-specific features, which provide the system sufficiently rich information across a plurality of transformations and across a plurality of ROI images thus ensuring that high-performance machine learning model can be trained only using document images not containing an anomaly. This enables the system to flag as an anomaly any variations that do not fall within the genuine variations of the class of documents, through the extensive analysis of documents not containing an anomaly. This feature results in additional benefits such as requiring less training data (only not containing an anomaly), hence improving the scalability of the method, as well as enabling anomaly detection for a new class of documents or fraud for which not enough sufficient data containing anomalies has been collected. A further benefit of adopting an unsupervised approach is that it improves protection against unknown attacks. A supervised machine learning model is trained to recognize only the anomalies present in the training dataset, which covers a limited number of anomalies (i.e. present at training time), and therefore limits the method to recognizing only that limited number of anomalies, leaving the method vulnerable to new unseen type of anomalies that might be developed post-training/deployment. On the other hand, an unsupervised machine learning model trained using document images not containing anomalies is not limited to any type of anomalies, and is capable to recognize any new unseen attacks. In some embodiments, other anomaly scores not derived from machine learning models, such as distance measures, are used for anomaly detection and the above comments apply mutatis mutandis.

Optionally, each machine learning model may be trained independently. The modularity of the method, split across different ROI regions and transformation, resulting in distinct training data sets and distinct training requirements for each machine learning model enables the training to be carried out independently.

Optionally, a computer-implemented method for detecting anomalies in images of documents in a class of documents using a system trained according to any of the preceding claims is disclosed. First, the method may comprise obtaining a query document image of a query document in the class of documents. Next, the query document image may be segmented into a plurality of query ROI images. Then, for each query ROI image, the plurality of transformations, may be applied to the query ROI image to generate transform-specific features for the query ROI image, and transform-specific anomaly scores may then be generated from the transform-specific features. Finally, the method may generate, based on the computed transform-specific thresholds and transform-specific anomaly scores, an output indicative of whether the query document image contains an anomaly or not.

Optionally, the method may further comprise, for each query ROI image, generating a respective region-specific anomaly score from the respective transform-specific anomaly scores for the ROI, wherein generating, based on the computed transform-specific thresholds and transform-specific anomaly scores, an output indicative of whether the query document image contains an anomaly or not comprises using the computed region-specific thresholds and region-specific anomaly scores. That is, the method may generate an output indicating the presence or absence of an anomaly in the query document based on the computed transform-specific thresholds and one or more transform-specific anomaly scores (e.g., generated from one transform-specific feature capturing color information in the Union Jack of a UK driving license or one transform-specific feature capturing frequency information in the hologram of the same UK driving license). Alternatively or additionally, the method may generate an output indicating the presence or absence of an anomaly in the query document based on the computed region-specific threshold and one or more region-specific anomaly scores (e.g., an anomaly score of the Union Jack of a UK driving license). In other words, the method may generate the output based on one or more particular features of corresponding one or more particular ROI images of the query document.

Optionally, the method may further comprise, generating a global anomaly score from the transform-specific and/or, as applicable, region-specific anomaly scores, wherein generating, based on the computed transform-specific thresholds and transform-specific anomaly scores, an output indicative of whether the query document image contains an anomaly or not comprises using the computed global threshold and global anomaly score. That is, in situations where the transform-specific anomaly scores and transform-specific thresholds, and, as applicable, the region-specific anomaly scores and region-specific thresholds do not individually flag the presence of an anomaly in the query document image, the method may still generate an output indicating the presence or absence of an anomaly in the query document image based on a global anomaly score and a global threshold.

Optionally, generating the output indicating whether there is an anomaly may be based on the transform-specific and/or region-specific features in combination. In other words, the method may generate the output based by combining the information of all transform-specific and/or region-specific features. In other words, the model may generate an output indicating the presence or absence of an anomaly based on the combination of features, even if the individual features do not themselves flag the presence of an anomaly when taken individually.

In some embodiments, the method flags an anomaly in a query document image if any of the region-specific anomaly scores is above a region-specific threshold or if any of the transform-specific anomaly score is above a transform-specific threshold or if the global anomaly score is above a global threshold. The region-specific and transform-specific thresholds may be specific not only to the transformation, but also to the ROI (e.g., a region-specific and/or transform-specific threshold may also be ROI specific: some ROIs may have higher threshold than other ROIs). These features advantageously provide a high-performance control of the model. Given the large number of ROI images and transformation for a single document image, it can be difficult to control the weighing of the resulting features to generate an outcome. The use of a global as well as region-specific and transform-specific thresholds ensures that each of these can be adjusted to take into account the available number of images available for an ROI and a transformation. For example, if only a few images of the Union Jack ROI of a UK driving license are available prior to training the machine learning, this can be reflected both by adjusting the region and/or transform specific local thresholds for this ROI as well as the global threshold for the UK driving license to reflect how much this ROI image is weighed when generating an output with respect to other features.

Optionally, generating the output indicative of whether the query document image contains an anomaly or not may be based on metadata about the query document image. Metadata may comprise information about the query document image such as image capture information, for example as can be found in any EXIF information present in obtained images, location and time of transmission, resolution, image compression, etc. That is, in addition to the features described above, metadata may also be taken into account by the method when deciding whether the query document contains an anomaly or not.

Optionally, the method may comprise aligning the training document images globally with respect to a reference document image, segmenting ROI images from each aligned training document image and further aligning the segmented ROI images locally with respect to the corresponding ROI image in the reference document image. Advantageously, this improves the alignment of ROI images in the data set beyond what is possible with a global alignment and therefore reduces unwanted noise in the data.

Optionally, the training document images may be segmented with respect to a segmentation mask, wherein the segmentation mask may be computed by obtaining the plurality of globally aligned training document images, generating a variability image by computing the pixel-level standard deviation, variance or any other suitable measure of variability of each pixel of the aligned training document images, across the aligned images, generating the segmentation mask by thresholding the variability image and defining one or more candidate ROIs for the document class by segmenting the segmentation mask. ROIs may be selected from the candidate ROIs based on the variability of pixels within the candidate ROIs between documents, for example a candidate ROI may be selected if an average of the measure of variability of its pixels or a fraction of its pixels that are above the thresholding threshold (or any similar measure) is between a lower and an upper threshold. In this way, ROI that have sufficient variability to indicate that something of interest is present while not being so variable as to indicate substantially noise rather than signal are selected for further processing.

Aspects extend to a computer program product or one or more computer-readable media encoding computer instructions that, when executed on a computing device, implement methods as described above and to a system comprising the one or more computer readable media, a memory, and a processor for executing the instructions. Further, aspects extend to a computer system comprising means for implementing the method steps described above and a computer system comprising a memory and a processor configured to carry out the method steps described above.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 1 illustrates a method of training a system for detecting anomalies in images of documents in a class of documents.

FIG. 2 illustrates a method of training a system for detecting anomalies in images of document in a class of documents by generating transform-specific and region-specific anomaly scores.

FIG. 5 illustrates a computer-implemented method for detecting anomalies in images of documents in a class of documents.

FIG. 7 shows a) example results of anomalous Union Jack ROI images of UK driving licenses and b) a reference image of a Union Jack ROI image of a UK driving license not containing an anomaly.

FIG. 8C shows an example of an image of a portion of a UK driving license containing anomalies (indicated by the 'x' symbol) and an example of a portion of a UK driving license not containing anomalies (indicated by the tick symbol).

DETAILED DESCRIPTION

Figure 3:
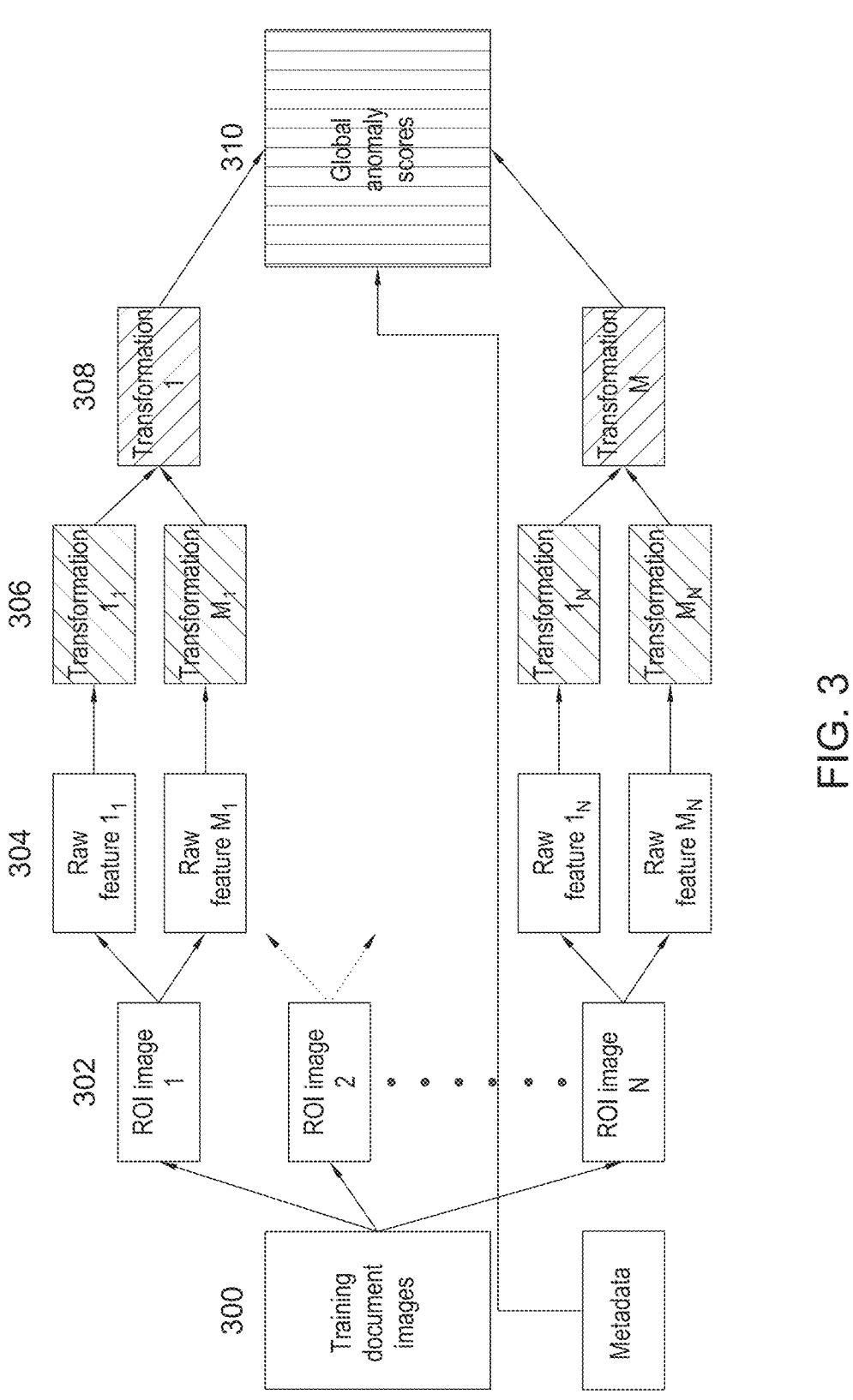
FIG. 3 illustrates a schematic diagram of one embodiment comprising transform-specific and region-specific anomaly scores.

FIG. 1 schematically depicts a high-level overview of a method 100 of training a system for detecting anomalies in images of documents in a class of documents. The documents may be government issued documents or otherwise official documents. An official document may take one of many forms such as a driving license, a passport, a utility or other bill, a birth certificate, a benefits book, a state identity card, or a residency permit. The term "official document" is therefore intended to cover any document that contains structured information that may be used to verify a person's identity or an aspect relating to a person, for example their address. The different forms of official document may be referred to herein as being a particular "class" of document, which may be further restricted by the territory of issue. For example, an official document class might be a 'UK passport', a 'Finnish driving license', etc.

With reference to FIG. 1, the method comprises three main stages: obtaining a plurality of training document images, processing each training document image to generate anomaly scores and computing thresholds to separate document images containing an anomaly from document images not containing an anomaly. A document image containing an anomaly may be indicative of fraud, and the document may thus be flagged or an alarm may be raised for the document to be reviewed by a human or rejected.

At step 102, a plurality of training document images of training documents in the class of documents is obtained. The document images may be obtained over a communications network from a client device, for example from a browser or an application. Specifically, a user on the client device may supply an image of the document, for example by taking a picture with the device or uploading a stored image.

At step 104, each training document image is segmented into a plurality of region of interest (ROI) images, each ROI image corresponding to a respective ROI of the training document. A region of interest of an image represents a region deemed to be rich in information about the image and can be a portion of or the whole image. For example, an ROI of a document can be a portion of a document that is rich in information about the document, unique and hard to reproduce. In practice, ROI images of a document could comprise images of security features, face pictures, sophisticated background patterns, digital images of holograms, etc. The ROIs of a document may be defined manually or automatically and are specific to the class of document. That is, if the class of documents is UK driving licenses, the Union Jack and the 'Driving license' text at the top of the document may be two of the ROIs for this class of documents. At the end of this step, a plurality of ROI images are obtained from the query document image.

At step 106, for each ROI image, a plurality of transformations is applied to the ROI image to generate respective transform-specific features for the ROI image, and transform-specific anomaly scores are generated from the transport-specific features, representing a measure of how well a feature of the ROI image matches corresponding features in ROI images of training documents of the same class of documents other than the respective training document. The number and/or type of transformations that are applied may be the same or different for each ROI image and may be advantageously chosen so they are specifically suited to the ROI image. For example, in the case of the Union Jack ROI image on a UK driving license, the transformations applied may be chosen to capture the color features of the Union Jack symbol. In some embodiments, the same number and type of transformations may be applied to all or some of the ROI images, while in other embodiments, different numbers and types of transformations may be applied to each ROI image. Steps 104 and 106 are repeated for each training document image in the plurality of training document images.

At step 108, based on the respective anomaly scores computed for the plurality of training document images, the method computes a transform-specific threshold for each transformation to separate document images containing an anomaly from document images not containing an anomaly.

With reference to FIG. 2, applying a plurality of transformations to an ROI image to generate respective features for the ROI image may comprise one or more of the following steps. A plurality of raw features may be extracted 200 from the ROI image, and then, for each raw feature extracted, a transformation may be applied 202 to generate a respective transform-specific feature for the ROI image. By way of example, applying the plurality of transformations may comprise one or more of extracting color information, frequency information, texture information (e.g., local binary patterns), shape information, or machine learnt features, such as deep learning features. Optionally, extracting, from the ROI image, a plurality of raw features may comprise pre-processing such as contrast stretching, transformation of the ROI image to another color space (e.g., YcBcR color space, grayscale image, HSV) and applying a pre-trained machine learning algorithm to the image (e.g., a pre-trained neural network). Next, respective transform-specific anomaly scores may be generated from the transform-specific features. It will be understood that the separation into raw and transform-specific transformations is optional, for example as described above with reference to FIG. 1.

At step 204, for each ROI image, a transformation may be applied to the transform-specific anomaly scores for the ROI image to generate a region-specific feature for the ROI image. The transformation applied in this step summarizes the transform-specific anomaly scores of the ROI image as the region-specific feature for the ROI image using information captured from all the transform-specific anomaly scores of the ROI image (e.g., color information, frequency information, pattern information, etc.). The transformation may, for example, simply concatenate the transform-specific anomaly scores for each ROI into a region-specific feature or may apply further operations to the transform-specific anomaly scores.

At step 206, a region-specific anomaly score may be generated from the region-specific feature for the raw image. The region-specific anomaly score may represent a measure of how well the ROI image matches corresponding ROI images of training documents of the same class of documents other than the respective training document. The region-specific anomaly score may be the region-specific feature (unity transformation), or a function of the region-specific feature with the same or different dimensions as the region-specific feature, or a scalar, etc.

After each a region-specific anomaly score is computed for each ROI image of each training document image, step 206 may compute, based on the respective region-specific anomaly scores of the plurality of training document images, a region-specific threshold for each ROI to separate document images containing an anomaly from document images not containing an anomaly.

An optional step 208 may further comprise generating, using the transform-specific and/or, as applicable, the region-specific anomaly scores for a training document image, a global anomaly score for the respective training document image. This process may then be repeated for each training document image in the plurality of training document images so that a global anomaly score is obtained for each training document image.

After the global anomaly scores are computed for each training document image, optional step 210 may compute, based on the respective global anomaly scores, a global threshold for the document class to separate document images containing an anomaly from document images not containing an anomaly.

The thresholds (i.e. transform-specific, region-specific, global) may be computed based on a false rejection rate (FRR), which represents the rate at which document images not containing an anomaly are tolerated to be incorrectly flagged as containing anomalies. The FRR may be determined a priori, and based on this the transform-specific thresholds, region-specific thresholds and global threshold may be set using holdout validation to achieve the corresponding predetermined FRR, for example as follows: a portion of the FRR is allocated to the transform-specific thresholds, a portion of the FRR is allocated to the region-specific thresholds and the remaining FRR budget is allocated to the global threshold. For example, if the FRR is set to be 6%, this may be equally allocated between the transform-specific, region-specific and global thresholds, so that $T_{transform}$=T such that flag$_{transform}$=2%, $T_{region}$=T such that flag$_{region}$=2% and $T_{global}$=T such that flag$_{global}$=2%. Alternatively, the FRR may be split unevenly between the three types of thresholds, or follow any other schedule, such as split to scale with the number of anomaly scores for each type of threshold.

The presence of an anomaly in a query document may be flagged if any of the transform-specific anomaly scores or any of the region-specific anomaly scores or the global anomaly score is above the corresponding threshold for that specific anomaly score (e.g., for the specific ROI image and for the specific transform). The presence of an anomaly in a query document image may also be flagged if the global score for the query document image is above the global threshold. In other words, a query document may be flagged to contain an anomaly if any of the transform-specific thresholds or region-specific thresholds or global thresholds are exceeded by the corresponding anomaly score of the query document.

The one or more of the transformations may comprise machine learning models and/or machine learning models may be used to produce anomaly scores as output. The machine learning models may comprise at least one supervised machine learning model or at least one unsupervised machine learning model. The machine learning models may comprise two or more class classifiers or clustering algorithms if both anomalous and non-anomalous documents are available for training a particular model at region and/or global level. The machine learning models may comprise anomaly detectors (e.g., isolation forests or one-class classifiers) if only non-anomalous documents are available for training a particular model at region and/or global level. Depending on the amount and type of training data available for each class of documents and for each ROI in the document, either a supervised or unsupervised machine learning model (anomaly detector or classifier/clustering model) may be manually or automatically selected. When sufficient document images containing an anomaly are available for a particular ROI and class of documents, a supervised machine learning model may be chosen, for example a two or more class classifier, and trained in a supervised manner using the labelled document images containing an anomaly and the labelled document images not containing an anomaly. In some embodiments, clustering models may be used in that case.

As mentioned above, training of a supervised machine learning model typically requires a reasonably large number of sample training images (i.e., document images containing an anomaly). Often, the availability of such training samples is limited, which can lead to a less robust supervised model and thus less accurate anomaly detection. To overcome this challenge, in some embodiments the system 100 can utilize a training sample generation pipeline to dynamically source a large number of training samples using production images.

The training sample generation pipeline leverages the ROI approach described herein by generating a dedicated supervised model for each of one or more ROIs in a given document, and training the dedicated models using a common data set comprising both genuine document samples and fraudulent document samples. The use of a common data set to generate and train the ROI-specific models eliminates the need to source a different training data set for each ROI. Furthermore, the common data set of genuine and fraudulent samples can be used for any ROI, even if a particular sample is not fraudulent for all ROIs in a document. As can be appreciated, the training sample generation pipeline described herein produces a flexible and scalable solution for sourcing training samples because a separate data set of genuine and fraudulent images need not be created for each ROI.

Figure 10:
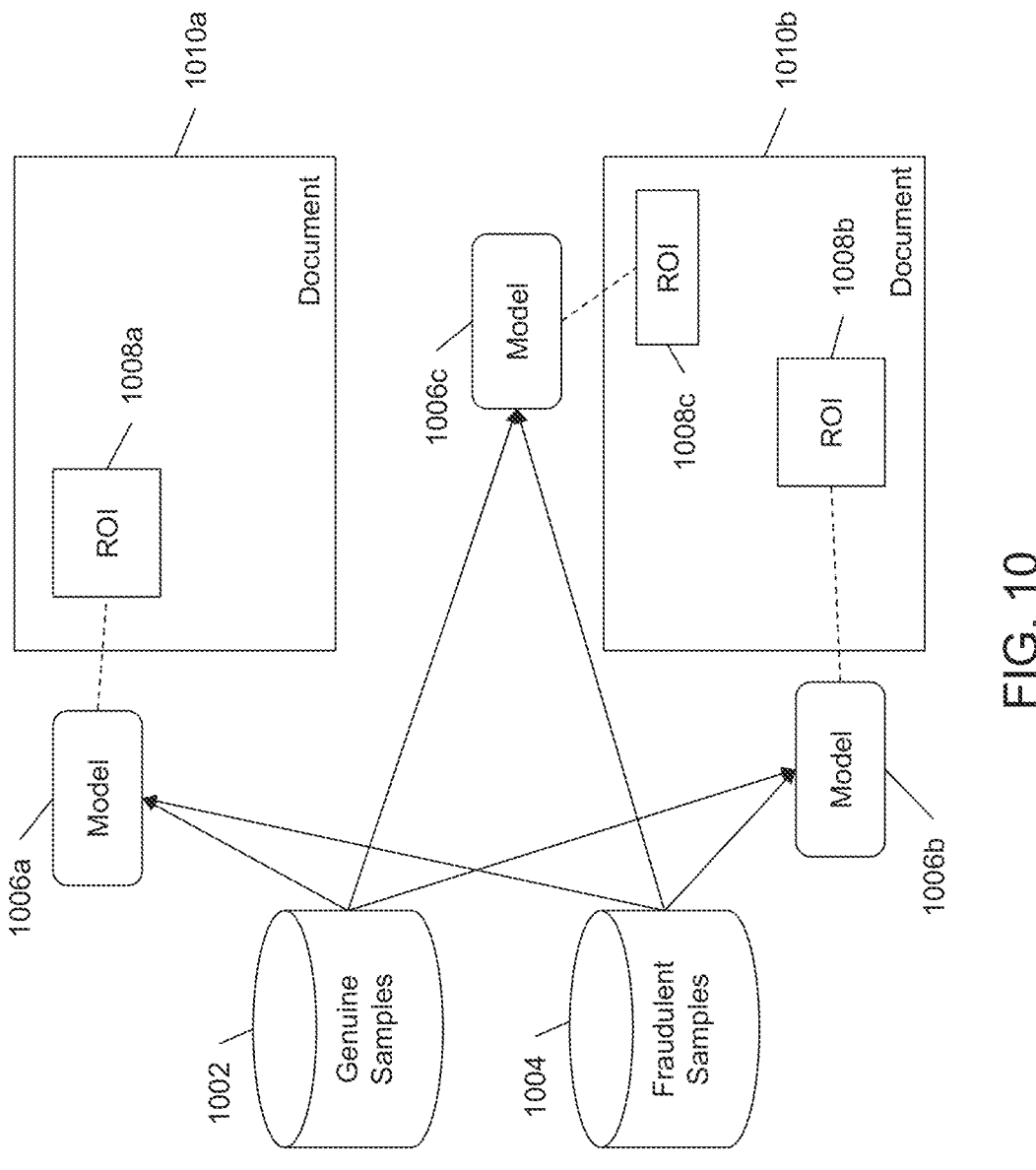
FIG. 10 illustrates a schematic diagram of a plurality of ROI-specific models for particular documents.

FIG. 10 illustrates a schematic diagram of a plurality of ROI-specific models for particular documents. As shown in FIG. 10, the system builds a dedicated supervised machine learning model 1006*a* for ROI 1008*a* in document 1010*a*, a dedicated supervised machine learning model 1006*b* for ROI 1008*b* in document 1010*b*, and a dedicated supervised machine learning model 1006*c* for ROI 1008*c* in document 1010*b*. These models 1006*a*, 1006*b*, and 1006*c* are built and trained using images from a production data store comprising genuine samples 1002 and fraudulent samples 1004. Advantageously, the system can train each model using one or more ROIs from genuine samples and/or fraudulent samples, regardless of whether a given sample is genuine or fraudulent for each ROI. This greatly expands the pool of available training samples for each ROI and enables generation of more accurate supervised machine learning models for the ROIs.

Figure 11:
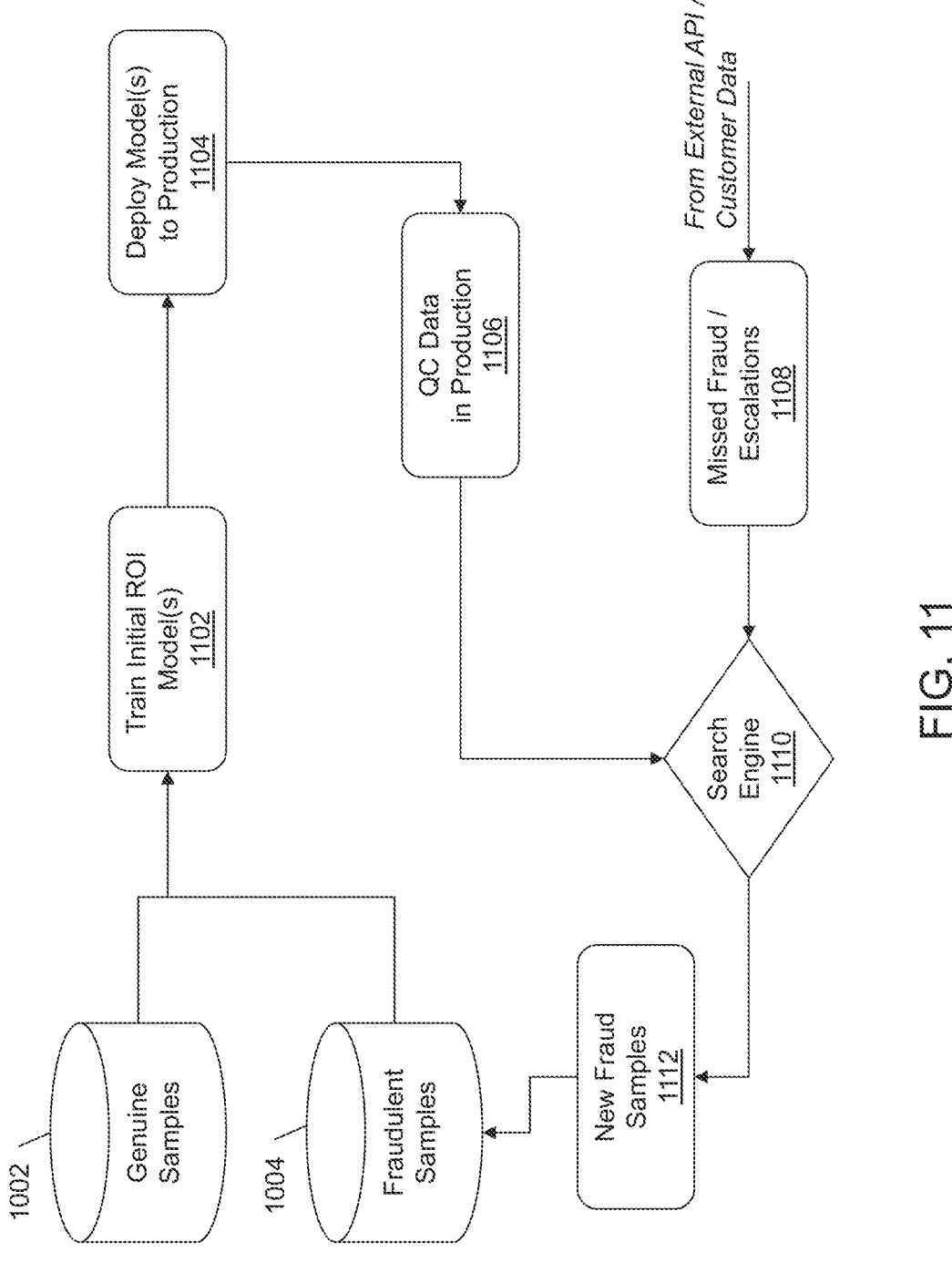
FIG. 11 illustrates a method of sourcing fraud samples from production images to be used in training a supervised machine learning model.

To accomplish this objective, the training sample generation pipeline enables an end user (e.g., an engineer, researcher, or system administrator), given one fraudulent sample, to source a large number of training samples from production data. FIG. 11 illustrates a method of sourcing fraud samples from production images to be used in training a supervised machine learning model. As shown in FIG. 11, the system trains (step 1102) one or more initial ROI model(s) using available production data (i.e., genuine samples 1002 and fraudulent samples 1004)—as described above with respect to FIG. 10. Once trained, the ROI model(s) are deployed to production (step 1104).

As the model(s) are used in production, one or more fraudulent images are identified (step 1106) using any of the anomaly detection techniques described herein. Concurrently, information relating to missed fraud and/or escalations is received (step 1108) from external sources, such as APIs and/or customer data. For example, a customer or external source using the anomaly detection system may determine that one or more fraudulent documents were not properly detected. Images and/or other data relating to the missed fraudulent documents can be provided to the system for use in generating new fraud samples.

When images of fraudulent documents are captured at steps 1106 and 1108, the system can process these images using search engine 1110 to identify similar documents from the fraudulent samples database 1104 and then use the captured images along with similar fraudulent images to train and/or retrain the ROI model(s). Specifically, the images are processed as follows:

a) One or more ROIs in each document (or the entire document) are converted into a vector representation (or embedding);

b) The embeddings are projected into an embedding space comprised of embeddings generated from a corresponding ROI in each of one or more images from the fraudulent samples 1104;

c) The projected embeddings are compared to the embeddings from the sample image ROIs to determine a similarity to one or more of the embeddings (e.g., using a distance metric or other type of comparison technique);

d) Images that have a similarity to the captured fraudulent image are identified as new fraud samples 1112; and e) The group of images with determined similarities are used as a training data set for subsequent training of ROI model(s).

Figure 12:
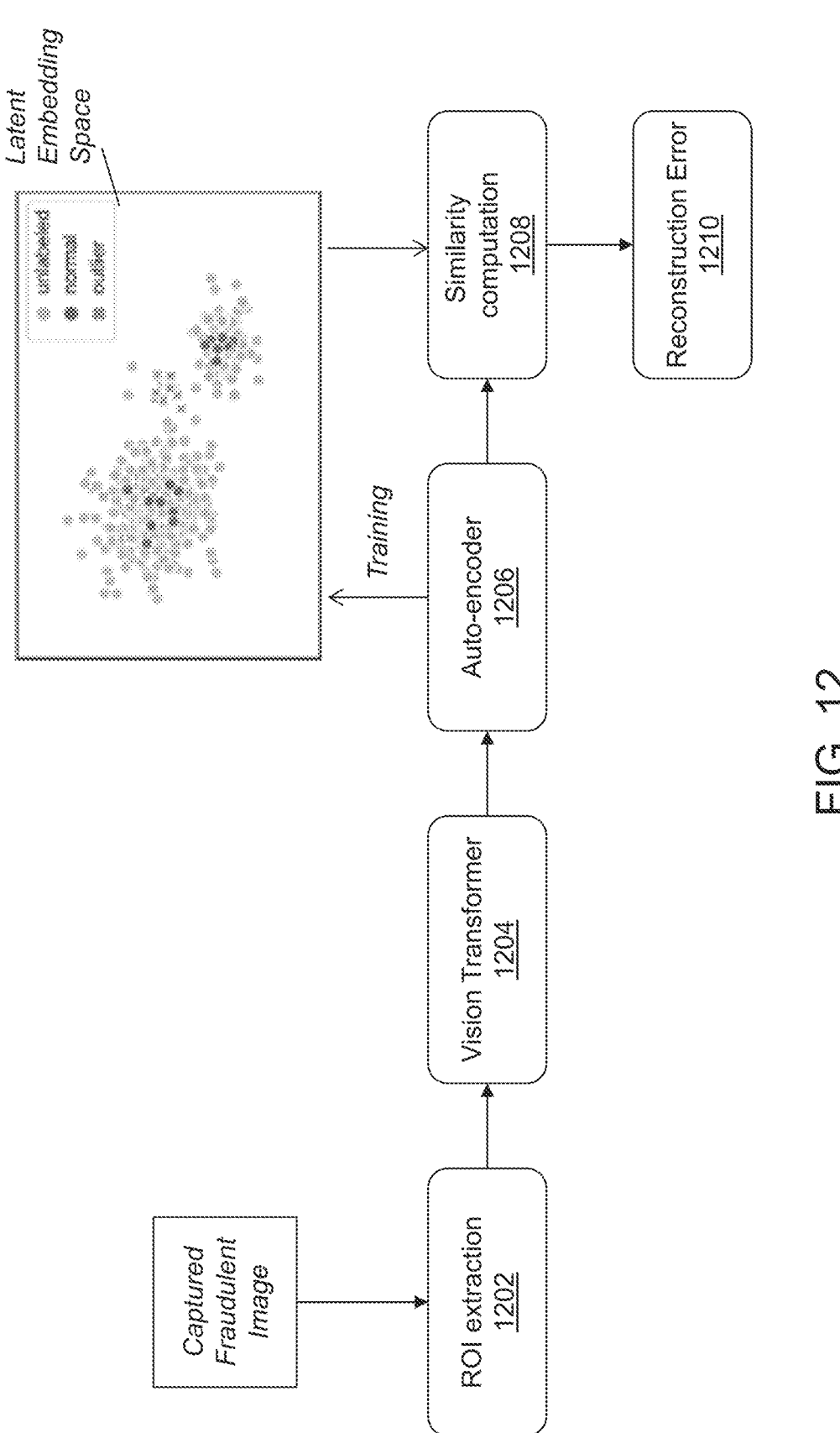
FIG. 12 illustrates a schematic diagram of generating embeddings from an image of a fraudulent document and determining its reconstruction error.

FIG. 12 illustrates a schematic diagram of generating embeddings from an image of a fraudulent document and determining its reconstruction error. As shown in FIG. 12, the image of a fraudulent document captured during QC or via customer escalation is provided to the system, which performs ROI extraction (step 1202) to, e.g., crop one or more portions of the image that correspond to the ROI(s). For each portion, the system applies a vision transformer (ViT) model (step 1204) which converts the image portion into a series of image patches and generates embeddings (e.g., patch and positional embeddings) from these image patches. The embeddings are fed into an auto-encoder (step 1206) which creates a latent embedding space (as described above) using the labels provided (i.e., fraudulent or genuine). The system then performs similarity computation (step 1208) using the latent embedding space and decodes the embedding back to the input space to determine the reconstruction error (step 1210). The reconstruction error is used as a measure of how fraudulent a sample is, instead of using a dedicated machine learning algorithm as is commonly done.

A benefit of the training sample generation pipeline described herein is the ability to execute the pipeline process via a user interface which enables end users to provide a given image of a fraudulent document (e.g., obtained during production use of the anomaly detection processes described herein), optionally identify one or more ROIs in the image, and search the production images (i.e., databases 1102, 1104) to source a large number of additional fraudulent and/or genuine images that are similar or have similar ROIs as the given image for the purpose of training or re-training the supervised machine learning model(s) that perform the anomaly detection in a production environment. As can be appreciated, this improvement provides the ability to quickly scale a robust, accurate supervised model for use in the system without requiring time-consuming generation of training data set(s).

Alternatively, if no or insufficient number of document images containing an anomaly are available or only a very small number of such images is available, an unsupervised machine learning model or an anomaly detection model may be chosen. Such a machine learning model may be trained using document images not containing anomalies. The modularity of the method, split across different ROI regions and transformation, resulting in distinct training data sets and distinct training requirements for each machine learning model enables the training of each machine learning model to be carried out independently. Thus, during the training stage, the machine learning models of method 100 may be trained independently.

The machine learning model can, for example, be one or more artificial neural networks (ANN)—for example, deep artificial neural networks (DNN) or convolutional neural networks (CNN), support vector machines (SVM), random forests or isolation forests. Artificial neural networks—for example, recurrent neural networks—represent a specific parametrization of a non-linear function (in terms of network weights). It will be appreciated that the present disclosure is not limited by the language used to describe the non-linear function or its structure. It will be understood that an artificial neural network in the context of a computer implemented invention refers to a physical entity that exists either in terms of a physical state of a general purpose or specifically adapted computing platform or in a specifically adapted physical circuitry, for example. The machine learning model may also comprise any form of supervised or unsupervised training algorithm.

Artificial neural networks (ANN) may be trained using a class of machine learning algorithms which characteristically use a cascade of multiple layers of nonlinear processing units for extracting features, where each successive layer uses the output from the previous layer as input—that is training a deep neural network (DNN).

One or more (in some embodiments all) anomaly scores may be computed based on a distance measure that is indicative of the distance between the transform-specific or, as applicable, region-specific features of the respective ROI image and a plurality of transform-specific or, as applicable, region-specific features of corresponding ROI images of training documents in the class of documents other than the respective ROI image. For example, the distance measure may be based on a Mahalanobis distance, as presented in more detail in the 'Example transformations' section below. In other embodiments, the anomaly score may be generated directly from the output of a machine learning model, for example as the output of an isolation forest, a classification score or other output of a classifier, a cluster belonging score and the like.

If the plurality of training document images contains training document images that contain and anomaly and training document images that do not contain an anomaly, a distance measure may be computed as the distance between an ROI image and corresponding ROI images of training documents in the same class of documents other than the ROI image that do not contain an anomaly. Optionally, an additional distance measure may be computed as the distance between the ROI image and corresponding ROI images of training documents in the same class of documents other than the ROI image that contain an anomaly. The distance measures may then be combined to compute an anomaly score for the ROI image.

If the one or more transformations comprise a machine learning model or one or more anomaly scores are generated using a machine learning model, as explained above, each machine learning model may be trained using either supervised or unsupervised learning, according to the amount and type of training data available for the class of document and ROI to which the transformation containing the machine learning model is applied. For the anomaly scores that are computed based on a distance measure, such as a Mahalanobis distance, the anomaly score is computed for every document image in the training set, and, once the query document is received during the inference stage, the distance measure is computed between the features generated by applying the transformations to the training set and the corresponding features of the query document.

One or more (in some embodiments all) anomaly scores may be computed based on any anomaly detection algorithm, including machine learning models. The anomaly detection algorithm may, for example, be a one-class classifier or an isolation forest. One-class classifiers are trained to identify objects of a specific class (e.g., image of documents not containing anomalies) amongst all objects, by learning from a training set containing only objects of that class (e.g., a training set formed of images of training documents in the class of documents not containing an anomaly). Isolation forest is an unsupervised learning algorithm for anomaly detection that works on the principle of isolating anomalies. In order to isolate data points containing anomalies, an isolation forest recursively generates partitions on the training data set by randomly selecting an attribute of the training instances and then randomly selecting a split value for the attribute, between the minimum and maximum allowed for the attribute.

In some embodiments, the document image (i.e. training and/or query document) may be a frame of a video of the document. The video of the query document may comprise an ordered sequence of frames and each frame in the ordered sequence of frames may correspond to a document image. The plurality of transformations may in this case be applied to the sequence of frames.

Prior to training the system, the training document images may be processed as follows. First, an image quality check may be performed to ascertain whether the document image is of a sufficiently good quality. The image quality check may also comprise checks that verify whether the full document is included in the query document image or whether there is any glare or blur present in the image which would prevent the correct processing of the query input image. Second, if the query document image has passed the quality check, the query document image may further be processed by a document classifier to determine the class of document that it belongs to. This step enables the transformations determined (and, in some embodiments, trained) during the training stage for the particular class to be applied and the relevant ROI images to be segmented (e.g., if the document class determined is UK driving licenses, then one on the ROIs may be the Union Jack picture). Third, the query document image may be aligned to a reference document image (e.g., a sample from the training set), as described in more details below, and the background in the query document image may be discarded, leaving only a crop of the document itself.

The training document images may be aligned globally with respect to a reference document image, which may, for example, be a sample training document image from the plurality of training document images. Each training document image may further be segmented into one or more ROI images. To reduce the misalignment between the same ROI images across the plurality of training document images, the method may comprise further aligning the segmented ROI images locally with respect to the corresponding ROI image in the reference document image. The local alignment may be performed using any alignment algorithm. In preferred embodiments, the alignment algorithm may be enhanced correlational coefficient maximization (see G. Evangelidis and E. Psarakis, "Parametric Image Alignment Using Enhanced Correlation Coefficient Maximization," IEEE Transactions on Pattern Analysis and Machine Intelligence 30(10), October 2008, 1858-1865, which is incorporated herein by reference).

The training document images may be segmented with respect to a segmentation mask, wherein the segmentation mask may be computed by obtaining the plurality of globally aligned training document images. The training document images may be resized to the same dimension and may be converted to a different color space (e.g., grayscale). Next, a standard deviation image may be generated by computing the pixel-level standard deviation of the aligned training document images. Any other measure of variability, such as variance, may be used instead of standard deviation. The standard deviation image computed this way shows where the varied information in the document lays. As certain ROIs in a document may be interpreted as static regions which do not change—or are changing much less than a varying field like personal details or signatures—across a set of documents (e.g., the Union Jack across a set of UK driving licenses would be the same, whether the signature of the driver would vary from document to document), the standard deviation image enables the automatic segmentation of ROIs for the class of documents. This way, the segmentation mask may be generated by thresholding the standard deviation image to preserve the regions with relatively low standard deviation below the threshold. Thresholding may, for example, be performed using Gaussian thresholding. Finally, one or more candidate ROIs for the document class may be defined by segmenting the segmentation mask.

With reference to FIG. 3, an example embodiment of a system embodying the described methods is presented. First, the plurality of training document images 300 are received as input, and each training image is segmented into N ROI images 302 (ROI 1, ROI 2, . . . ROI N), for example as defined in a corresponding reference document for the class of documents that the training documents belong to. Next, a plurality of transformations is applied to each ROI image to generate transform-specific features for the ROI image. In this embodiment, a different number of transformations is applied to each ROI image ($M_1$ transformations for ROI 1, $M_2$ transformations for ROI 2, etc.). The type of transformations applied to each ROI image may be different, the same, and/or only partially overlapping between different ROIs. Applying the transformations may in some embodiments comprise extracting a plurality of raw features 304 for each ROI image, one raw feature for each transformation. Applying the plurality of transformations may comprise one or more of extracting color information, frequency information, texture information, shape information, or machine learning features, such as deep learning features.

Next, for each raw feature of an ROI image, a transformation 306 is applied to generate a transform-specific feature for the ROI and a transform-specific anomaly score is generated from the transform-specific features. By way of example, if the raw feature extracted contains texture information, the feature generated by applying a transformation may comprise information describing the global or local patterns of the texture in the ROI image to which the transformation is applied. The transform-specific features generated at this stage are specific to each transformation and each ROI. The anomaly score may be a distance measure based on the transform specific features, or the output of a machine learning model, as described above.

At the end of this stage, based on the transform-specific anomaly scores generated for all the training documents, a transform-specific threshold is computed for each transformation from the plurality of transformations. The transform-specific threshold may be used to separate document images containing an anomaly from document images not containing an anomaly.

In the following stage, for each ROI image, a region-specific transformation 308 is applied to the plurality of transform-specific anomaly scores of the ROI image to generate a region-specific feature which summarizes information from all the features to which the transformation is applied. For example, if the transform-specific features contain information about the color, texture and shape of the ROI image, the region-specific feature will summarize the information about the color, texture and shape of the ROI image. The region-specific transformation may simply concatenate the anomaly scores of the ROI image or apply further transformations. The generated region-specific feature is then used to generate a region-specific anomaly score for the ROI image. At the end of this stage, the region-specific anomaly scores are used to compute a region-specific threshold for each ROI in the document of the class of documents. The region-specific thresholds may be used, together with the transform-specific thresholds, to separate document images containing an anomaly from document images not containing an anomaly.

The transform-specific and region-specific anomaly scores are then used to compute, for each training document image, a global anomaly score. Finally, based on the global anomaly scores 310 generated for each training document, a global threshold for the class of document is computed. The global thresholds may be used, together with the transform-specific threshold and region-specific thresholds, to separate document images containing an anomaly from document images not containing an anomaly.

Figure 4:
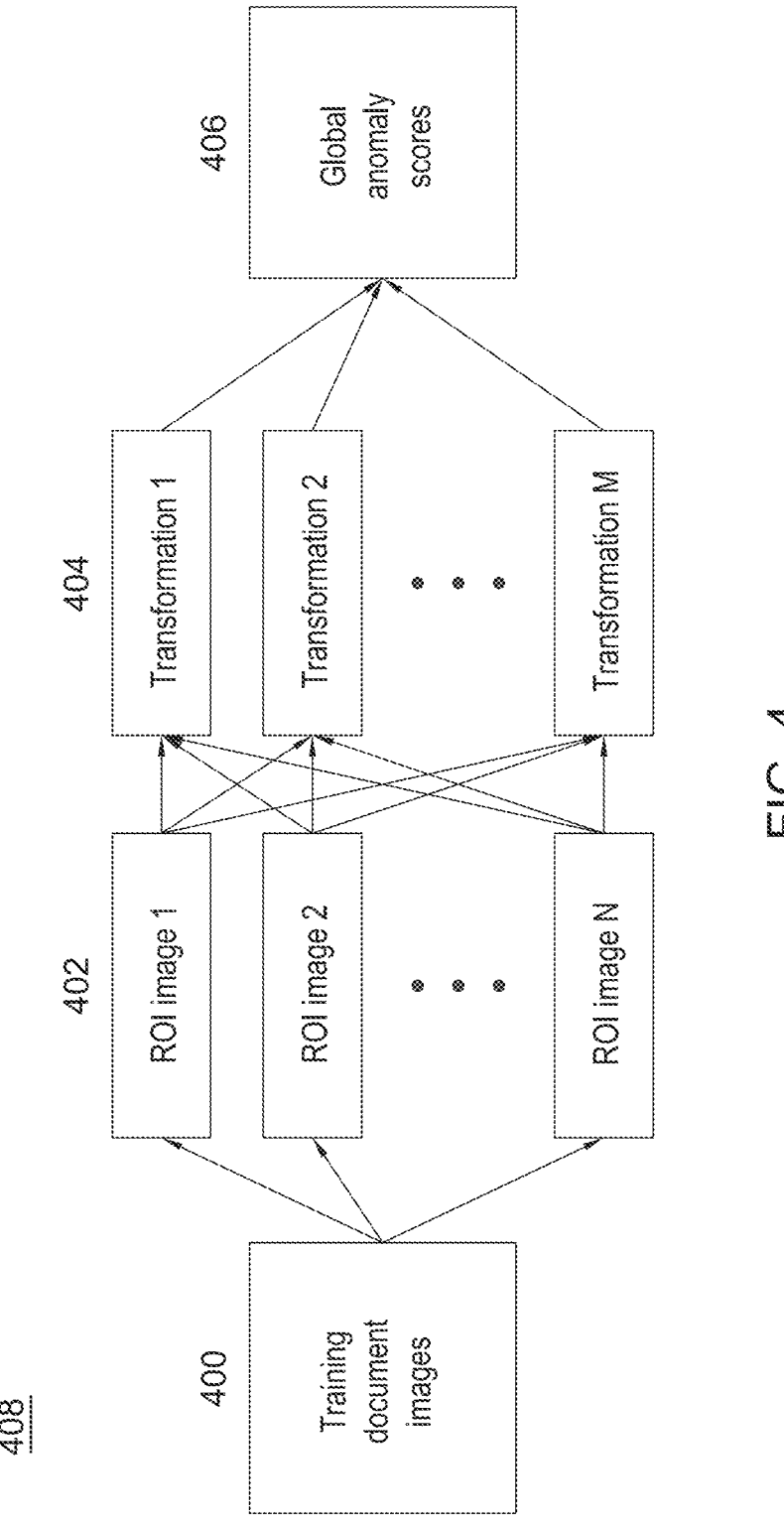
FIG. 4 illustrates a schematic diagram of another embodiment comprising transform-specific anomaly scores.

With reference to FIG. 4, another example embodiment of the described methods is presented. First, training document images 400 are received as input and segmented into N ROI images 402 (ROI 1, ROI 2, . . . ROI N) as defined in a corresponding reference document for the class of documents that the training documents belong to. Next, a plurality of transformations 404 is applied to each ROI image. In this embodiment, the same number and type of transformations is applied to each ROI image to generate a plurality of transform-specific features, which are then used to generate transform-specific anomaly scores. Based on the respective anomaly scores of the plurality of training document images, method 408 computes a transform-specific threshold for each transformation to separate document images containing an anomaly from document images not containing an anomaly. Method 408 further generates a global anomaly score 406 for each training document using the transform-specific anomaly scores, and based on the respective global anomaly scores, computes a global threshold for the document class to separate document images containing an anomaly from document images not containing an anomaly.

The embodiments in FIGS. 3 and 4 are presented here by way of example only and many other embodiments are also possible.

Once the system is trained, it may be used to detect anomalies in a query document image, as illustrated in FIG. 5. First, the method may comprise obtaining 502 a query document image of a query document in the class of documents. Next, the query document image may be segmented 504 into a plurality of query ROI images. Then, for each query ROI image, the plurality of transformations, may be applied 506 to the query ROI image to generate transform-specific features for the query ROI image, and transform-specific anomaly scores may then be generated from the transform-specific features. Finally, the method may generate 508, based on the computed transform-specific thresholds and transform-specific anomaly scores, an output indicative of whether the query document image contains an anomaly or not.

The method may further comprise, for each query ROI image, generating a respective region-specific anomaly score from the transform-specific anomaly scores for the ROI, wherein generating, based on the computed transform-specific thresholds and transform-specific anomaly scores, an output indicative of whether the query document image contains an anomaly or not comprises using the computed region-specific thresholds and region-specific anomaly scores. That is, the method may generate an output indicating the presence or absence of an anomaly in the query document based on the computed transform-specific thresholds and one or more transform-specific anomaly scores (e.g., generated from one transform-specific feature capturing color information in the Union Jack of a UK driving license or one transform-specific feature capturing frequency information in the hologram of the same UK driving license). Alternatively or additionally, the method may generate an output indicating the presence or absence of an anomaly in the query document based on the computed region-specific threshold and one or more region-specific anomaly scores (e.g., an anomaly score of the Union Jack of a UK driving license). In other words, the method may generate the output based on one or more particular features of corresponding one or more particular ROI images of the query document.

The method may further comprise, generating a global anomaly score from the transform-specific and/or, as applicable, region-specific anomaly scores, wherein generating, based on the computed transform-specific thresholds and transform-specific anomaly scores, an output indicative of whether the query document image contains an anomaly or not comprises using the computed global threshold and global anomaly score. That is, in situations where the transform-specific anomaly scores and transform-specific thresholds, and, as applicable, the region-specific anomaly scores and region-specific thresholds do not flag the presence of an anomaly in the query document image, the method may still generate an output indicating the presence or absence of an anomaly in the query document image based on a global anomaly score and a global threshold.

In some embodiments, the method flags an anomaly in a query document image if any of the region-specific anomaly scores is above a region-specific threshold or if any of the transform-specific anomaly score is above a transform-specific threshold or if the global anomaly score is above a global threshold. The region-specific and transform-specific thresholds may be specific not only to the transformation, but also to the ROI (e.g., a region-specific and/or transform-specific threshold may also be ROI specific: some ROIs may have higher threshold than other ROIs). These features advantageously provide a high performance control of the model. Given the large number of ROI images and transformation for a single document image, it can be difficult to control the weighing of the resulting features to generate an outcome. The use of a global as well as region-specific and transform-specific thresholds ensures that each of these can be adjusted to take into account the available amount of images available for an ROI and a transformation. For example, if only a few images of the Union Jack ROI of a UK driving license are available prior to training the machine learning, this can be reflected both by adjusting the region and/or transform specific local thresholds for this ROI as well as the global threshold for the UK driving license to reflect how much this ROI image is weighed when generating an output with respect to other features.

Optionally, generating the output indicative of whether the query document image contains an anomaly or not may be based on metadata about the query document image. Metadata may comprise information about the query document image such as image capture information, for example as can be found in any EXIF information present in obtained images, location and time of transmission, resolution etc. That is, in addition to the features described above, metadata may also be taken into account by the method when deciding whether the query document contains an anomaly or not.

Example Transformations

The one or more transformations that are applied to ROI images are chosen in such a way as to generate features that can easily be analyzed in order to establish whether the ROI image adheres to what is expected for that particular ROI image and/or ROI feature for the document type. Depending on the type of transformation applied, a different type of pre-processing may be applied, suitable for the feature to be generated. Several examples of such transformations and pre-processing are presented in the examples below.

Color information. The plurality of transformations may comprise transformations that generate features that summarize the color characteristics of a particular ROI image. Optionally, this type of transformations may be implemented based on the histograms of the RGB values. During pre-processing, contrast stretching may be used on the RGB ROI image. To fill the entire dynamic range, every channel of the RGB image is rescaled to be between the $2^{nd}$ and $98^{th}$ percentile of that particular channel. The transformation extracts the 3D histogram over all three input channels, after which the results 3D histogram is flatted into one feature vector zhist. Then, a Gaussian Mixture Model is fitted on the feature vectors of a plurality of corresponding ROI images of documents in the same class of documents, with the number of components chosen by minimizing the Bayesian Information Criterion. After fitting the Gaussian Mixture Model, an anomaly score is computed for the ROI image of the query document by evaluating the log probability of the concatenated histograms under the trained mixture model. Every mixture component $N(x; \mu_k, \Sigma_k)$ is indexed by a weighting factor $\pi$ k:

$$\log p(z_{Hist}) = \log \sum_{i=0}^{K} \pi_k N\left(z_{Hist}; \mu_k, \sum_k\right)$$

Where:

$N(z_{Hist}; \mu_k, \Sigma_k)$=Normal distribution (Gaussian) with parameters $\mu_k$ and $\Sigma_k$ evaluated at point $z_{Hist}$;

$\mu_k$=the mean component of the k-th Gaussian;

$\Sigma_k$=the covariance matrix of the k-th Gaussian;

$\pi_k$=the weighting factor of the k-th Gaussian;

$z_{Hist}$=flattened 3D color histogram (described above);

log(x)=natural logarithm of input x.

Frequency information. The frequency content of an image provides information about the rate of change in the image, with high frequencies representing the rapidly changing parts of the image and low frequencies the more constant parts. Such information allows the system to capture anomalies due to compression and/or texture, for instance, Discrete Cosine Transforms (see N. Ahmed, T. Natarajan, and K. R. Rao, "Discrete Cosine Transform," IEEE Transactions on Computers, Vol. C-23, Issue 1, January 1974, pp. 90-93, which is incorporated herein by reference) are examples of commonly used transformations in digital signal processing to decompose an image in a finite sum of cosine functions oscillating on different frequencies, hence Discrete Cosine Transforms may be applied as a transformation to extract and generate features summarizing frequency information in an ROI image.

During pre-processing, the RGB image may be transformed to YcBcR color space. After this, a Discrete Cosine Transform (DCT) may be applied to obtain:

$$Z_{DCT}(u, v) =$$

$$\left(\frac{2}{N}\right)^{0.5}\left(\frac{2}{M}\right)^{0.5}\sum_{i=0}^{N-1}\sum_{i=0}^{M-1}\Lambda(i)\cdot\Lambda(j)\cdot\cos\left[\frac{\pi u}{2N}(2i+1)\right]\cos\left[\frac{\pi v}{2M}(2j+1)\right]\cdot p(i, j)$$

$$\text{With } \Lambda(i) = \frac{1}{\sqrt{2}} \text{ if } i = 0, 1 \text{ if } i > 0.$$

Where:
N=number of rows;
M=number of columns;
u=row element of DCT matrix;
v=column element of DCT matrix;
cos[x]=cosine of x;
π=the number pi (3.14);
p(i, j)=pixel value at location [i, j].

The feature vector obtained $Z_{DCT}$ may then be projected down to a set of principal components $z_{PCA}$ to reduce its dimensionality using Principal Component Analysis (see H. Abdi and L. J. Williams, "Principal Component Analysis," Wiley Interdisciplinary Reviews: Computational Statistics, Vol. 2, Issue 4, Jul. 15, 2010, pp. 433-459, which is incorporated herein by reference). Alternatively or optionally, an anomaly score may be calculated based on the Mahalanobis distance, which measures the distance from a point to a distribution using the equation:

$$MD(x)=\sqrt{(x-\mu)^T\Sigma^{-1}(x-\mu)}$$

where x is the input, μ denotes the mean of the distribution, $\Sigma^{-1}$ denotes the inverse of the covariance matrix and $(x-\mu)^T$ represents the transpose of the vector x-p. Applying this formula to the feature vector $z_{PCA}$ obtained by applying the Discrete Cosine Transform and Principal Component Analysis, results in an anomaly score calculated as:

$$MD(z_{PCA})=\sqrt{(z_{PCA}-\mu)^T\Sigma^{-1}(z_{PCA}-\mu)}$$

where $MD(z_{PCA})$ represents the distance from the feature vector $Z_{DCT}$ of the ROI image of the query document to corresponding feature vectors of corresponding ROI images of documents in the class of documents other than the query document do not contain an anomaly.

Texture information. The plurality of transformations may comprise transformations that generate texture features, which describe repeated variations in the intensity of a surface. Two examples of transformations which may be used to model texture patterns are Gray Level Co-Occurrence Matrices (see R. Haralick, K. Shanmugam, and I. H. Dinstein, "Textural Features for Image Classification," IEEE Transactions on Systems, Man, and Cybernetics, Vol. SMC-3, Issue 6, November 1973, pp. 610-621, which is incorporated herein by reference) and Local Binary Patterns (see T. Ojala, M. Pietikainen, and T. Maenpaa, "Multiresolution Gray-scale and Rotation Invariant Texture Classification with Local Binary Patterns," IEEE Transactions on Pattern Analysis and Machine Intelligence, Vol. 24, Issue 7, July 2002, pp. 971-987, which is incorporated herein by reference). Gray Level Co-Occurrence Matrices analyze how differing grayscale values are distributed inside an image patch and characterizes the distribution of texture across an image at a global level. Local Binary Patterns is a local texture descriptor that models the relationship between the neighboring pixels and may be applied to generate features that are descriptive of local texture in an ROI. The pre-processing for texture information transformations may comprise converting the ROI image to a grayscale image. Similarly to frequency transformations, Mahalanobis distance may be used to compute a distance measure between the query ROI image and corresponding ROI images of documents in the class of documents other than the query document do not contain an anomaly.

Shape information. The plurality of transformations may comprise transformations that generate features that model the geometry of the objects in an image, which may be done by looking at contours, key points, or any other characteristic that describes the geometry. Shape transformations may comprise Scale Invariant Feature Transforms (SIFT) (see D. Lowe, "Distinctive Image Features from Scale-Invariant Keypoints," International Journal of Computer Vision, 60(2), November 2004, pp. 91-110, which is incorporated herein by reference), which are a type of transforms that describe the key points in an input image. The pre-processing for texture information transformations may comprise converting the ROI image to HSV color space. Similarly to frequency transformations, Mahalanobis distance may be used to compute a distance measure between the query ROI image and corresponding ROI images of documents in the class of documents other than the query document do not contain an anomaly.

Deep learning features. The plurality of transformations may comprise transformations that generate features using deep learning models. Such deep learning models may be trained on a large and varied dataset. The trained model may then be used to generate features from an ROI image by loading the trained model and then passing the ROI image through the layers of the model, and extracting the output of one of the layers, usually the output layer, optionally applying one or more transformations such as max pooling, and generating a feature vector $z_{deep}$ of the ROI image as the extracted layer. By way of example, the trained deep learning architecture may be a pre-trained VGG16 on an ImageNet architecture (see K. Simonyan and A. Zisserman, "Very Deep Convolutional Networks for Large-Scale Image Recognition," arXiv:1409.1556 [cs.CV], Apr. 10, 2015, which is incorporated herein by reference). Optionally, the dimensionality of $z_{deep}$ may be reduced using dimensionality algorithms such as Principal Component Analysis. Similarly to frequency transformations, Mahalanobis distance may be used to compute a distance measure between the query ROI image and corresponding ROI images of documents in the class of documents other than the query document do not contain an anomaly.

Example Results

Figure 6:
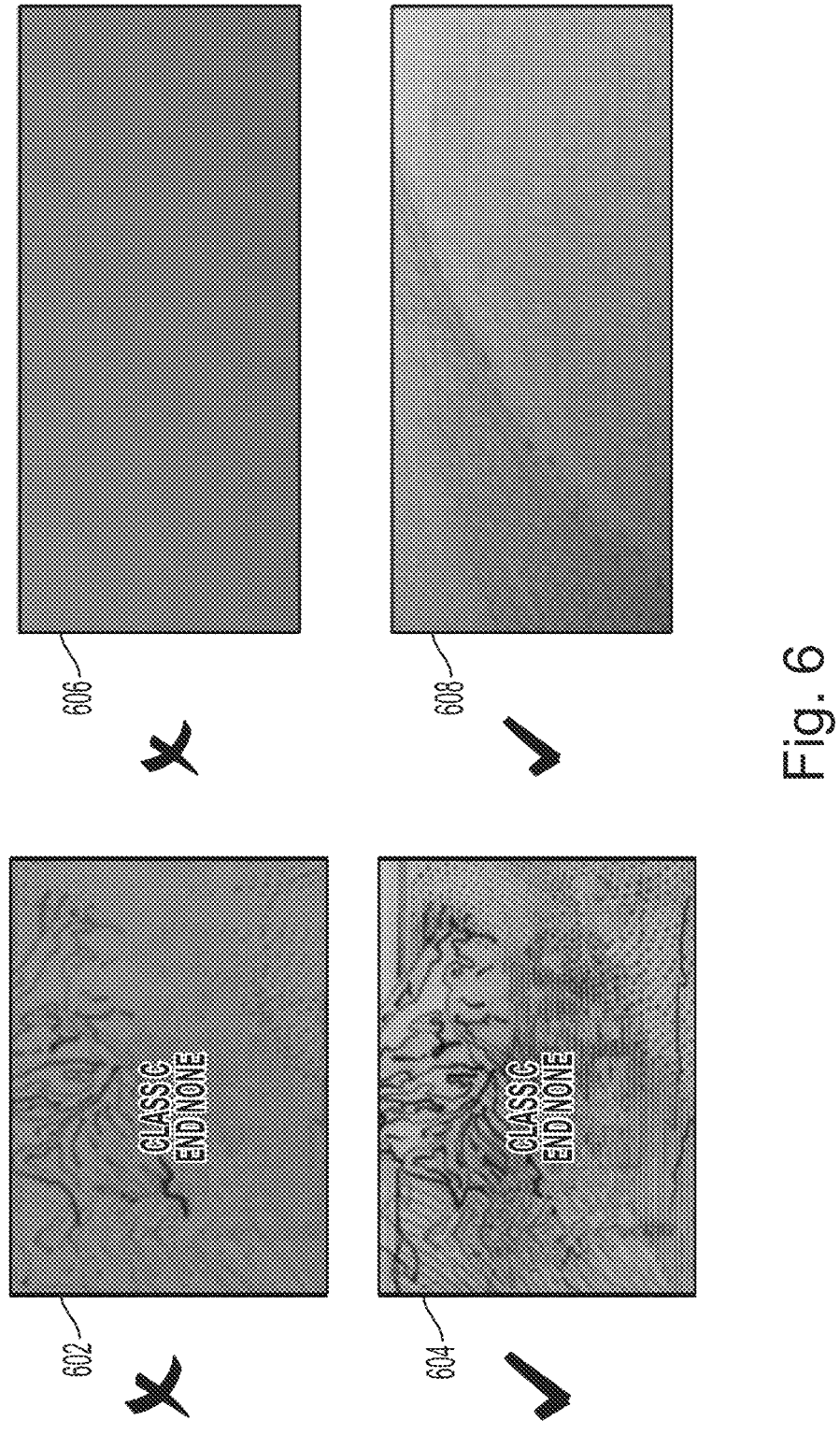
FIG. 6 shows an example result of color and background anomalies flagged by the method in a query image document.

With reference to FIGS. 6-8, example results are presented.

FIG. 6 shows an example result of color and background anomalies flagged by the method in a query image document. The images on the left show two ROI images of the same forest ROI of an identity document: the top image 602 contains an anomaly while the bottom image 604 does not contain an anomaly. The color of the forest in the top image 602 is of a different color than that of the forest in documents not containing an anomaly. As indicated by the 'x' symbol, method 100 correctly identifies this by applying color specific transformations and flags the ROI image as containing an anomaly. The images on the right show two ROI images of background details in the same type of documents. By applying a set of transformations suited to detecting fine background details, method 100 is able to correctly flag the top image 606 as containing anomalies (lack of fine background details, as can be observed by visual comparison with the bottom image 608 which does not contain any anomalies).

FIG. 7 shows a) example results of anomalous Union Jack ROI images 702 of UK driving licenses and b) a reference image 704 of a Union Jack ROI image of a UK driving license not containing an anomaly. It can be observed that method 100 is sensitive to a varied set of anomalies within the same ROI, showing that method 100 is not specific to a particular type of anomaly, but is instead able to detect multiple different fluctuations from the non-anomalous ROI of UK driving licenses (e.g., different colors, different contrasts, presence of other unexpected features).

Figure 8A:
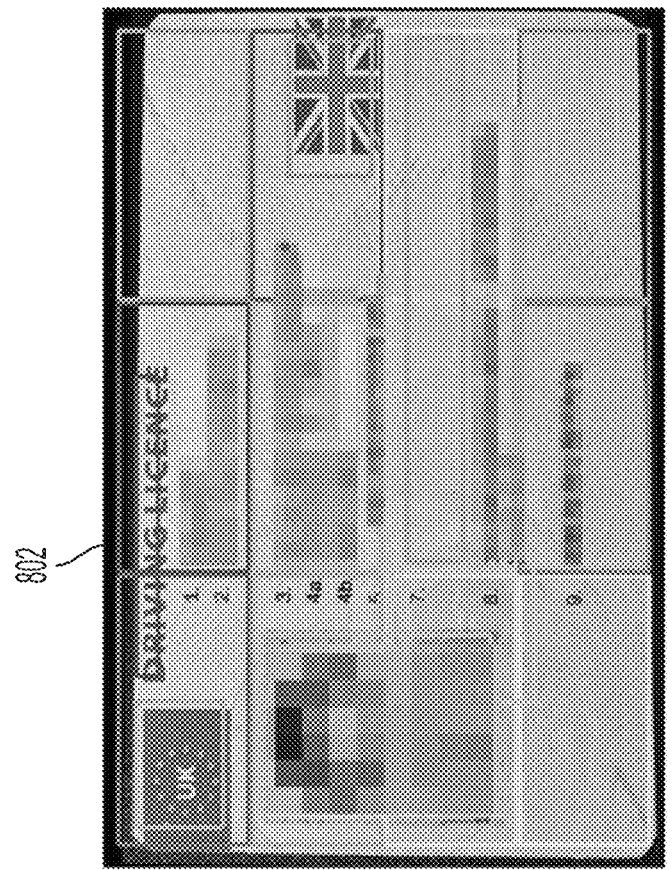
FIG. 8A shows an example query document image of a UK driving license containing anomalies in the outer top left regions and in the 'Driving License' text region.

FIG. 8A shows an example query document image 802 of a UK driving license containing anomalies in the outer top left regions and in the 'Driving License' text region. Taking the example of this UK driving license, with reference to FIG. 8A, ROI images that correspond to different ROIs of the license are generated. In this particular example, ROI images are generated for regions such as the Union Jack flag, the 'Driving License' text, the 'UK'/EU flag region, the face picture, background patterns, different text fields, etc.

Figure 8B:
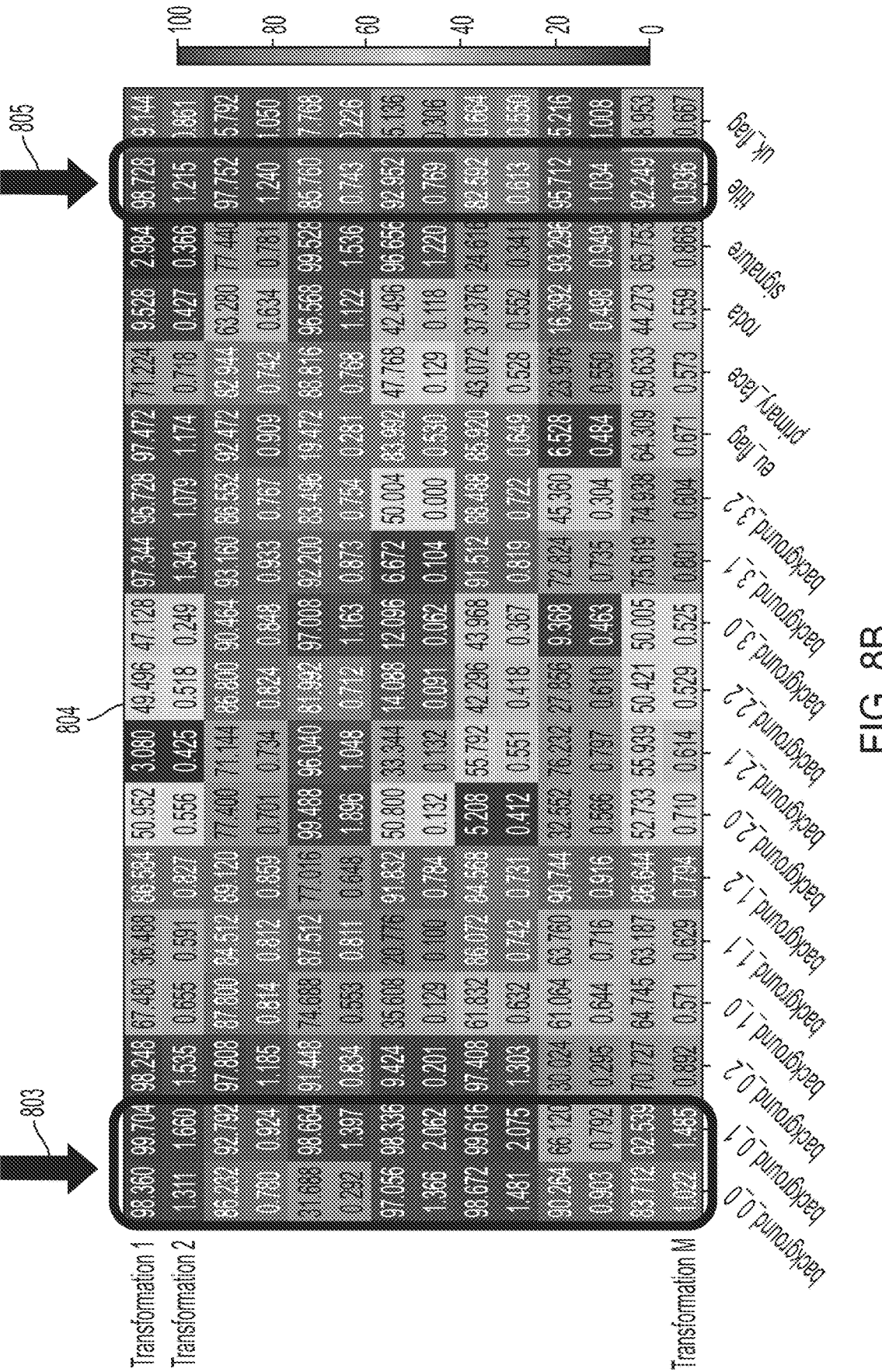
FIG. 8B shows results showing the anomalies detected by the method (indicated by the black arrows).

FIG. 8B shows the results 804 of processing every ROI image (as indicated by the labels of every column) with every one of M transformations (as indicated by the labels of every row). The number in every box represents the percentile of an ROI image and a transformation computed by method 100. The corresponding percentile indicates where the ROI image of the query document image falls with respect to a plurality of corresponding ROI images of documents in the class of documents not containing an anomaly. For example, a number of 99 would indicate that the ROI image of the query document is farther away from the distribution of documents not containing an anomaly (as computed, for example, using the Mahalanobis distance) than 99% of the documents not containing an anomaly. That is, the farther away the ROI image of the query document is from the distribution for a particular transformation, the higher the number. By looking at the regions highlighted by the method to potentially contain an anomaly (indicated by the black arrows), it can be seen that method 100 flags anomalies in the outer top left regions 803 (denoted by 'background_0_0' and 'background_0_1' labels) as well as in the 'Driving License' text region 805 (denoted by the 'title' label).

Indeed, when looking at a close up 806 of these regions in the query document (left image in FIG. 8C and the corresponding regions in an image 808 of a document in the same class not containing an anomaly (right image in FIG. 8C), we can see that the model picks up on these anomalies as it expects a wider edge around the 'UK'/EU flag ROI and the 'Driving License' text region.

Figure 9:
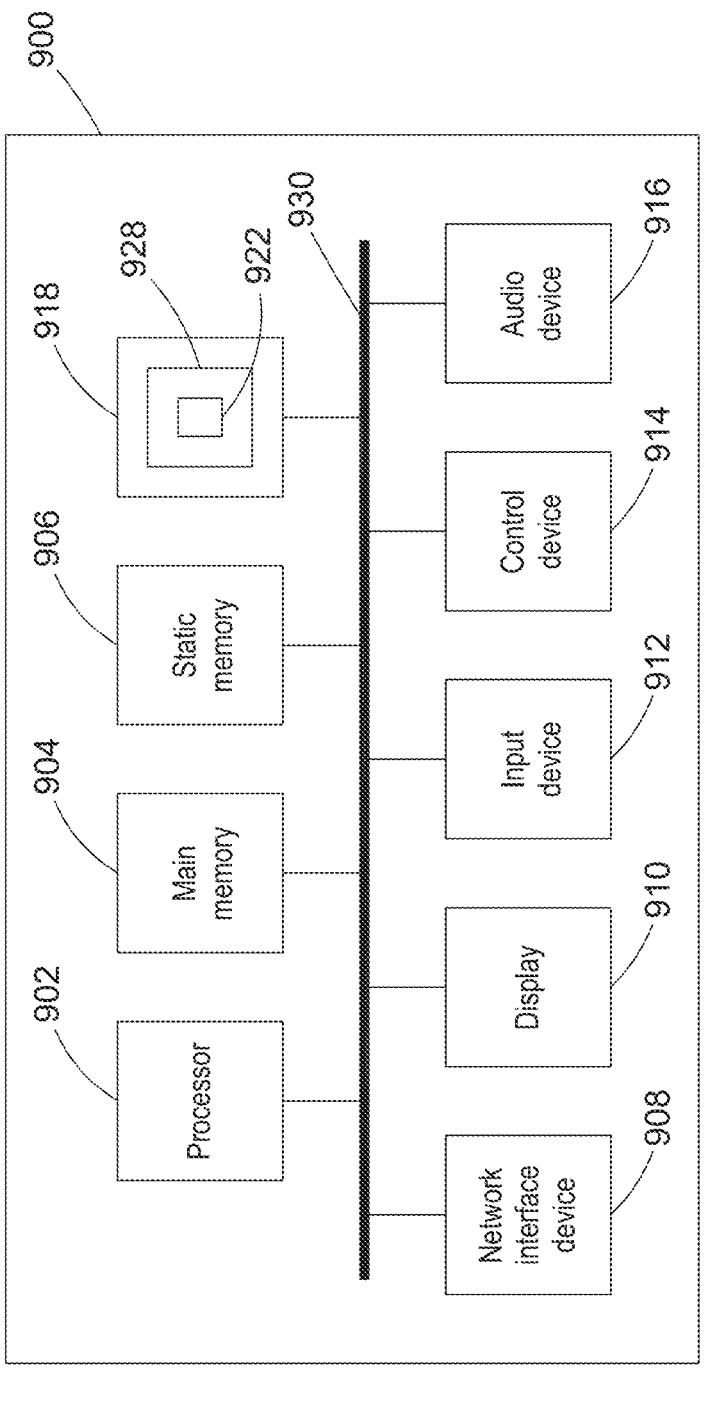
FIG. 9 shows an example implementation of a computing device which may be used to implement the methods of the present disclosure.

FIG. 9 illustrates a block diagram of one implementation of a computing device 900 within which a set of instructions, for causing the computing device to perform any one or more of the methodologies discussed herein, may be executed. In alternative implementations, the computing device may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a secondary memory (e.g., a data storage device 918), which communicate with each other via a bus 930.

Processing device 902 represents one or more general-purpose processors such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. Processing device 902 is configured to execute the processing logic (instructions 922) for performing the operations and steps discussed herein.

The computing device 900 may further include a network interface device 908. The computing device 800 also may include a video display unit 910 (e.g., a liquid crystal display (LCD) or a cathode ray tube (CRT)), an alphanumeric input device 912 (e.g., a keyboard or touchscreen), a cursor control device 914 (e.g., a mouse or touchscreen), and an audio device 916 (e.g., a speaker).

The data storage device 918 may include one or more machine-readable storage media (or more specifically one or more non-transitory computer-readable storage media) 928 on which is stored one or more sets of instructions 922 embodying any one or more of the methodologies or functions described herein. The instructions 922 may also reside, completely or at least partially, within the main memory 904 and/or within the processing device 902 during execution thereof by the computer system 900, the main memory 904 and the processing device 902 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "obtaining", "determining", "comparing", "extracting", "normalizing," "generating", "providing", "applying", "training", "feeding", "cropping", "mapping", "selecting", "evaluating", "assigning", "computing", "calculating", "training", "computing", "aligning", "determining" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices. Training the system may refer to adjusting or determining parameters of the system, such as thresholds, parameters for distance calculations or training machine learning models, as the case may be.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A computer-implemented method of sourcing training images for a system for detecting anomalies in images of documents in a class of documents, the method comprising:

(a) obtaining one or more document images of a fraudulent document;

(b) for each document image:

(i) segmenting the document image into one or more region of interest (ROI) images, each ROI image corresponding to a respective ROI of the fraudulent document;

(ii) generating a vector representation of each ROI image in an embedding space, the embedding space comprising vector representations of one or more other ROI images from a plurality of sample document images;

(iii) determining a similarity between each ROI image from the fraudulent document and one or more other ROI images from sample document images using the vector representations in the embedding space; and (iv) selecting a plurality of sample document images that have ROI images similar to the ROI images from the fraudulent document and generating a training data set using the selected sample document images; and (c) in response to a determination that a size of the training data set exceeds a predetermined size threshold, training a supervised anomaly detection machine learning model using the training data set.

2. The method of claim 1, wherein the vector representation of each ROI image is generated using a vision transformer (ViT) model.

3. The method of claim 1, wherein the similarity is determined using a distance metric.

4. The method of claim 1, wherein the one or more document images of the fraudulent document are obtained from an external application programming interface (API) or a user interface of a production anomaly detection system.

5. The method of claim 1, wherein at least one of the one or more ROI images comprises an image of the entire fraudulent document.

6. The method of claim 1, wherein at least one of the one or more ROI images comprises an image of a portion of the fraudulent document.

7. The method of claim 1, wherein generating a vector representation of each ROI image in an embedding space comprises projecting the vector representation into the embedding space.

8. The method of claim 1, wherein training a supervised anomaly detection machine learning model using the training data set comprises:

training a plurality of supervised anomaly detection machine learning models using the training data set, each supervised anomaly detection machine learning model corresponding to a respective ROI of the fraudulent document.

9. A system for sourcing training images for a system for detecting anomalies in images of documents in a class of documents, the system comprising a computing device having a memory for storing computer-executable instructions and a processor that executes the computer-executable instructions to:

(a) obtain one or more document images of a fraudulent document;

(b) for each document image:

(i) segment the document image into one or more region of interest (ROI) images, each ROI image corresponding to a respective ROI of the fraudulent document;

(ii) generate a vector representation of each ROI image in an embedding space, the embedding space comprising vector representations of one or more other ROI images from a plurality of sample document images;

(iii) determine a similarity between each ROI image from the fraudulent document and one or more other ROI images from sample document images using the vector representations in the embedding space; and (iv) select a plurality of sample document images that have ROI images similar to the ROI images from the fraudulent document and generating a training data set using the selected sample document images;

(c) determine whether a size of the training data set exceeds a predetermined size threshold; and (d) in response to a determination that the size of the training data set exceeds the predetermined size threshold, train a supervised anomaly detection machine learning model using the training data set; or (e) in response to a determination that the size of the training data set does not exceed the predetermined size threshold, train an unsupervised anomaly detection machine learning model using the training data set.

10. The system of claim 9, wherein the vector representation of each ROI image is generated using a vision transformer (ViT) model.

11. The system of claim 9, wherein the similarity is determined using a distance metric.

12. The system of claim 9, wherein the one or more document images of the fraudulent document are obtained from an external application programming interface (API) or a user interface of a production anomaly detection system.

13. The system of claim 9, wherein at least one of the one or more ROI images comprises an image of the entire fraudulent document.

14. The system of claim 9, wherein at least one of the one or more ROI images comprises an image of a portion of the fraudulent document.

15. The system of claim 9, wherein generating a vector representation of each ROI image in an embedding space comprises projecting the vector representation into the embedding space.

16. The system of claim 9, wherein training a supervised anomaly detection machine learning model using the training data set comprises:

training a plurality of supervised anomaly detection machine learning models using the training data set, each supervised anomaly detection machine learning model corresponding to a respective ROI of the fraudulent document.

\* \* \* \* \*